(12) United States Patent  
Cioffi et al.

(10) Patent No.: US 8,031,761 B2  
(45) Date of Patent: *Oct. 4, 2011

(54) ADAPTIVE MARGIN AND BAND CONTROL

(75) Inventors: John M. Cioffi, Atherton, CA (US);
Wonjong Rhee, San Francisco, CA (US); Georgios Ginis, San Mateo, CA (US); Seong Taek Chung, Redwood City, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/940,970

(22) Filed: Nov. 5, 2010

(65) Prior Publication Data

US 2011/0051906 A1 Mar. 3, 2011

Related U.S. Application Data

(63) Continuation-in-part of application No. 10/893,826, filed on Jul. 19, 2004, now Pat. No. 7,558,315, application No. 12/940,970, which is a continuation of application No. 11/995,195, filed as application No. PCT/US2006/026796 on Jul. 8, 2006, now Pat. No. 7,830,955.

(60) Provisional application No. 60/527,853, filed on Dec. 7, 2003, provisional application No. 60/698,113, filed on Jul. 10, 2005.

(51) Int. Cl.
*H04B 1/38* (2006.01)

(52) U.S. Cl. ........................................................ 375/222

(58) Field of Classification Search .................. 375/222
See application file for complete search history.

(56) References Cited

U.S. PATENT DOCUMENTS

| 5,479,447 | A | 12/1995 | Chow et al. |
| 5,832,387 | A | 11/1998 | Bae et al. |
| 6,058,162 | A | 5/2000 | Nelson et al. |
| 6,061,427 | A | 5/2000 | Ryoo |

(Continued)

FOREIGN PATENT DOCUMENTS

CN 1210399 3/1999

(Continued)

OTHER PUBLICATIONS

European Search Report for European Patent Application No. 10179600.1 Mailed Oct. 26, 2010, 5 Pages.

(Continued)

*Primary Examiner* — Juan A Torres

(74) *Attorney, Agent, or Firm* — Blakely Sokoloff Taylor & Zafman LLP

(57) ABSTRACT

Configuration or otherwise controlling parameters of a Digital Subscriber Line (DSL) system related to power, band usage and margin is based on collected operational data. Operational data are collected from at least one DSL system operating under a known configuration and/or a profile. A target profile is selected based on binder-level information. The collected operational data is analyzed and conditions for changing the DSL system configuration to the target profile are evaluated, including any applicable transition rules pertaining to changing profiles. If the conditions hold, then the DSL system is instructed to operate with the target profile. Binder-level information can include deployment point information, topology information, and/or crosstalk coupling information. The controlled parameters may have values that are chosen using one or more spectrum balancing methods. Such spectrum balancing methods may be executed infrequently, and may make use of all binder-level information that is available.

39 Claims, 12 Drawing Sheets

U.S. PATENT DOCUMENTS

| | | | |
|---|---|---|---|
| 6,075,821 | A | 6/2000 | Kao et al. |
| 6,111,936 | A | 8/2000 | Bremer |
| 6,229,855 | B1 | 5/2001 | Takatori et al. |
| 6,236,714 | B1 | 5/2001 | Zheng et al. |
| 6,292,559 | B1 | 9/2001 | Gaikwad et al. |
| 6,327,677 | B1 | 12/2001 | Garg et al. |
| 6,345,071 | B1 | 2/2002 | Hamdi |
| 6,356,585 | B1 | 3/2002 | Ko et al. |
| 6,532,277 | B2 | 3/2003 | Ulanskas et al. |
| 6,549,520 | B1 | 4/2003 | Gross et al. |
| 6,580,727 | B1 | 6/2003 | Yim et al. |
| 6,633,545 | B1 | 10/2003 | Milbrandt |
| 6,636,603 | B1 | 10/2003 | Milbrandt |
| 6,647,058 | B1 | 11/2003 | Bremer et al. |
| 6,711,207 | B1 | 3/2004 | Amrany et al. |
| 6,744,811 | B1 | 6/2004 | Kantschuk |
| 6,785,371 | B1 | 8/2004 | Olaffson |
| 6,870,901 | B1 | 3/2005 | Gudmundsson et al. |
| 7,035,249 | B2 | 4/2006 | Christensen et al. |
| 7,106,833 | B2 | 9/2006 | Kerpez |
| 7,369,596 | B2 | 5/2008 | Steiger et al. |
| 7,593,458 | B2 | 9/2009 | Cioffi |
| 7,623,630 | B2 | 11/2009 | Ferdosi et al. |
| 2002/0009155 | A1 | 1/2002 | Tzannes |
| 2002/0118652 | A1 | 8/2002 | Ahmed et al. |
| 2002/0136397 | A1 | 9/2002 | Zeng et al. |
| 2002/0141443 | A1 | 10/2002 | Christensen et al. |
| 2003/0031239 | A1 | 2/2003 | Posthuma |
| 2003/0086514 | A1 | 5/2003 | Ginis et al. |
| 2003/0108191 | A1 | 6/2003 | Kerpez |
| 2003/0123560 | A1 | 7/2003 | Jacobsen et al. |
| 2004/0034875 | A1 | 2/2004 | Bulkowski et al. |
| 2004/0120390 | A1 | 6/2004 | Brown et al. |
| 2004/0161048 | A1 | 8/2004 | Zaleski, II et al. |
| 2004/0230444 | A1 | 11/2004 | Holt et al. |
| 2005/0123027 | A1 | 6/2005 | Cioffi et al. |
| 2005/0123028 | A1 | 6/2005 | Cioffi et al. |
| 2005/0163286 | A1 | 7/2005 | Jiang et al. |
| 2005/0190826 | A1 | 9/2005 | Van Bruyssel et al. |
| 2005/0213714 | A1 | 9/2005 | Lanberg et al. |
| 2005/0220178 | A1 | 10/2005 | Ginis |
| 2005/0220179 | A1 | 10/2005 | Tsatsanis |
| 2005/0220180 | A1 | 10/2005 | Barlev et al. |
| 2005/0237940 | A1 | 10/2005 | Tennyson |
| 2005/0259725 | A1 | 11/2005 | Cioffi |
| 2006/0072722 | A1 | 4/2006 | Savoor et al. |
| 2006/0159026 | A1 | 7/2006 | Wu et al. |
| 2006/0159106 | A1 | 7/2006 | Van Slyke et al. |
| 2006/0164101 | A1 | 7/2006 | Fossion et al. |
| 2007/0280334 | A1 | 12/2007 | Lv et al. |
| 2008/0071516 | A1 | 3/2008 | Cioffi et al. |

FOREIGN PATENT DOCUMENTS

| | | |
|---|---|---|
| DE | 10001150 | 7/2001 |
| EP | 1009135 | 6/2000 |
| EP | 1213848 | 6/2002 |
| EP | 1283655 | 2/2003 |
| EP | 1337062 | 8/2003 |
| EP | 1699172 | 9/2006 |
| EP | 1804450 | 7/2007 |
| JP | 2000295285 | 10/2000 |
| JP | 2003-76620 | 3/2003 |
| JP | 2003274053 | 9/2003 |
| JP | 2005236854 | 9/2005 |
| WO | WO-9859426 | 12/1998 |
| WO | WO-01/35611 | 5/2001 |
| WO | WO0135614 | 5/2001 |
| WO | WO0180510 A1 | 10/2001 |
| WO | WO-03/013109 | 2/2003 |
| WO | WO-0313109 | 2/2003 |
| WO | WO2005/036919 | 4/2005 |
| WO | WO-2005057315 | 6/2005 |
| WO | WO-2005057857 | 6/2005 |
| WO | PCT/US2006/038605 | 10/2006 |
| WO | WO-2007/033579 | 3/2007 |
| WO | WO-2007044326 | 4/2007 |

OTHER PUBLICATIONS

Non-Final Office Action for U.S. Appl. No. 12/089,044, Mailed Nov. 12, 2010, 16 pages.

Int'l Preliminary Report on Patentablility mailed Apr. 9, 2009 for International Application No. PCT/US06/038605, (Dec. 22, 2008), 9 pgs.

Notice of Allowance mailed Mar. 2, 2009 for U.S. Appl. No. 10/893,826, 9 pages.

Non-Final Office Action for European Application No. 04801293.4 Mailed May 5, 2010, 4 Pages.

Non-Final Office Action for European Patent Application No. 06755837.9; Mailed Jun. 17, 2010, 4 Pages.

Non-Final Office Action for China Application No. 200680007001.2 Mailed Aug. 19, 2010, 9 Pages.

Non-Final Office Action for Chinese Application No. 200480041317.4 Mailed Sep. 7, 2010, 10 Pages.

4th Office Action mailed Oct. 23, 2009 for Chinese Application No. 200480041317.4.

3rd Office Action mailed Apr. 10, 2009 for Chinese Application No. 200480041317.4.

2nd Office Action mailed Sep. 19, 2008 for Chinese Application No. 200480041317.4.

Int'l Preliminary Report on Patentability mailed Jan. 8, 2009 for International Application No. PCT/US2006/038605.

Non-Final Office Action for European Patent Application No. 06755837.9; Mailed Feb. 11, 2009, 4 Pages.

First Official Report mailed Dec. 17, 2009 for Australian Patent Application No. 2006228424, 2 pages.

Non-Final Office Action for U.S. Appl. No. 11/995,195 Mailed Mar. 12, 2010, 19 Pages.

Non-Final Office Action mailed Feb. 10, 2010 for Australian Patent Application No. 2006268293, 2 Pages.

Supp'l European Search Report mailed Jan. 19, 2010 for European Application No. 06786827.3, 4 Pages.

"International Search Report", International Application No. PCT/IB2004003960, (Aug. 10, 2006), 9 pgs.

"International Search Report", mailed Aug. 31, 2006 for International Application No. PCT/IB2006/000824, 4 pgs.

"ITU-T "Recommendation G.992.1"", Asymmetric digital subscriber line (ADSL) transceivers, Series G, as provided by International Searching Authority, Reference No. XP-002321806, (Jun. 1999), 226-239.

Cendrillon, et al., "Optimal Multi-user Spectrum Management for Digital Subscriber Lines", 2004 IEEE International Conference on Communications; vol. 1, Jun. 20-24, 2004., ISBN: 0-7803-8533, (Jun. 2004), 5 pgs.

Chan, Vincent M., et al., "Multiuser Spectrum Optimization for Discrete Multitone Systems with Asynchronous Crosstalk", IEEE Transactions on Signal Processing, Vol. 55, No. 11, Nov. 2007. University of Toronto.

Chung, Seong T., "Rate and power control in a two-user multicarrier channel with no coordination: the optimal scheme vs. suboptimal methods", Vehicular Technology conference, 2002, Proceedings, VTC 2002-Fall. 2002 IEEE 56th vol. 3, (Sep. 2002), 1744-1748, vol. 3.

Cioffi, John , et al., "10MDSL Beyond All Goals, and Spectrally Compatible woth ADSL and VDSL, from CO or RTs", ANSI Contribution T1E1.4/2002-129, (Apr. 8, 2002), 10 pgs.

Cioffi, John , et al., "Autonomous DSM Mixture of Symetric and Asymetric Service: Bi-directional Iterative Waterfilling (at Level 0 or at Level 1)", ANSI Contribution T1E1.4/2002-058R1.

Cioffi, John , et al., "Autonomous Level 0 DSM Results: iterative-water-filing for ADSL", ANSI Contribution T1E1.4/2002-057, (Feb. 18, 2002), 10 pgs.

Cioffi, John M., et al., "Channel Identification with Dynamic Spectrum Management", ANSI Contribution T1E1.4/2001-147, (May 7, 2001), 8 pgs.

Cioffi, John , et al., "Channel Identification with Dynamic Spectrum Management", ANSI Contribution T1E1.4/2001-147R1, (Nov. 5, 2001), 9 pgs.

Cioffi, John , et al., "Coordinated Level 2 DSM Results: Vectoring of multiple DSLs", ANSI T1E1.4/2002-059, (Feb. 18, 2002), 8 pgs.

Cioffi, John, "Draft Sections 1 and 4 proposed, Dynamic Spectrum Management", ANSI Contribution T1E1.4/2002-040R1, (Apr. 8, 2002), 4 pgs.

Cioffi, John, et al., "Examples Improvements of Dynamic Spectrum Management", ANSI Contribution T1E1.4/2001-089R1, (Feb. 19, 2001), 14 pgs.

Cioffi, John, et al., "Indication of Capability to Release Channel Information", ANSI Contribution T1E1.4/2002-041R1, (Apr. 8, 2002), 3 pgs.

Cioffi, John, et al., "Indication of Capability to Release Channel Information", ANSI Contribution T1E1.4/2001-146R2, (Nov. 5, 2001), 3 pgs.

Cioffi, John, et al., "Indication of Capability to Release of Channek Information", ANSI Contributuion T1E1.4/2001-146R1, (May 7, 2001), 3 pgs.

Cioffi, John, et al., "Indication of Capability to Release of Channel Information", ANSI Contribution T1E1.4/2002-041, (May 7, 2001), 3 pgs.

Cioffi, John, et al., "Indication of Capability to Release of Channel Information", ANSI Contribution T1E1.4/2002-041R4, (Nov. 18, 2002), 3 pgs.

Cioffi, John, et al., "Indication of Capability to Release of Channel Information", ANSI Contribution T1E1.4/2002-041R3, (Aug. 19, 2002), 4 pgs.

Cioffi, John, et al., "Iterative Waterfilling for Dynamic Spectrum Management", ANSI Contribution T1E1.4/2001-200R5, (Nov. 5, 2001), 14 pgs.

Cioffi, John, et al., "Iterative Waterfilling for Dynamic Spectrum Management", ANSI Contribution T1E1.4/2001-200R3, (Aug. 20, 2001), 1 pgs.

Cioffi, John, et al., "'New Technology' in Spectrum Management", ANSI Contribution T1E1.4/2002-128, (Apr. 8, 2002), 2 pgs.

Cioffi, John, "Proposal for Study of Spectrum Management for the Evolving Unbundling Architecture of DSL", ANSI Contribution TIE1.4/2001-090, (Feb. 19, 2001), 3 pgs.

Cioffi, John, et al., "Proposed Scope and Mission for DSM (188)", ANSI Contribution T1E1.4/2001-188R4, (Nov. 5, 2001), 4 pgs.

Cioffi, John, et al., "Proposed Scope and Mission for DSM (188)", ANSI Contribution T1E1./2001-188R2, (Aug. 20, 2001), 4 pgs.

Cioffi, John, et al., "Proposed 'Stretch Goals' for 10MDSL", ANSI Contribution T1E1.4/2002-181R1, (Aug. 19, 2002), 7 pgs.

Cioffi, John, et al., "Proposed 'Stretch Goals' for 10MDSL", ANSI Contribution TiE1.4/2002-181, (Aug. 19, 2002), 6 pgs.

Cioffi, John, et al., "Response to 2001-273R1 using measured Verizon DSL SNRs", ANSI Contribution T1E1.4/2002-069, (Feb. 18, 2002), 15 pgs.

Cioffi, John, et al., "Some proposed Section 7.1 text for ADSL fixed-margin mode", ANSI Contribution T1E1.4/2002-176R1, (Nov. 18, 2002), 13 pgs.

Cioffi, John, et al., "Some proposed Section 7.1 text for ADSL fixed-margin mode", ANSI Contribution T1E1.4/2002-176, (Aug. 19, 2002), 3 pgs.

Cioffi, John, "Unbundled DSL Evolution", ANSI Contribution T1E1.4/2001-088., (Feb. 19, 2001), 6 pgs.

European Patent Office, "First Examination Report for EP Application No. 4801293.4", (Dec. 13, 2007).

Kerpez, et al., "Advanced DSL Management", IEEE Communications Magazine; vol. 41, No. 11, XP-001177649, (Sep. 9, 2003), 116-123.

Kerpez, K., "Jointly Optimizing DSL Spectra", ANSI Contribution T1E1.4/2002-231, (Nov. 18, 2002), 12 pgs.

Kerpez, K., et al., "Response to 2001-273R1 using Telcordia DSL Analysis", ANSI Contribution T1E1.4/2002-063R1, (Feb. 18, 2002), 3 pgs.

Le Nir, Vincent, et al., "Optimal Power Allocation under Per-Modem Total Power and Spectral Mask Constraints in xDSL Vector Channels with Alien Crosstalk", ICASSP 2007, (Apr. 15, 2007).

Lesham, A., "Dynamic FDM and Dynamic DS Power Back-Off: A Simplified DSM Algorithm for Coexistence between RT and CO based deployments", ANSI Contribution T1E1.4/2002-284, (Nov. 17, 2002), 9 pgs.

Liu, Yu-Sun, et al., "Distributed Dynamic Spectrum Management for Digital Subscriber Line", Institute of Electronics, Information and Communication Engineers (IEICE), vol. E90-B, No. 3, Mar. 2007, 491-498.

Patent Cooperation Treaty, "International Search Report and Written Opinion", International Application No. US2006/026796, (Apr. 10, 2007), 7 pgs.

Patent Cooperation Treaty, "International Search Report and Written Opinion", International Application No. PCT/US06/38605, (Nov. 17, 2008), Whole Document.

Rashdi, Adnan, et al., "Spectrum Management for Digital Subscriber Lines", Student Conference On Engineering, Sciences and Technology, Publication Date Dec. 2004, 5 Pages.

Rhee, W., "Multiuser Wireless Communications with Multiple Antennas", Dissertation Submitted to the Department of Electrical Engineering and the Committee on Graduate Studies of Stanford University., (Jun. 2002), 129 pgs.

Song, et al., "Dynamic Spectrum Management for Next-Generation DSL Systems", IEEE Communications Magazine, XP-002395021, (Oct. 2002), 101-109.

State IP Office of P.R. China, "Notification of the First Office Action", Chinese Application No. 200480041317.4, (Mar. 7, 2008).

USPTO, "Notice of Allowance", U.S. Appl. No. 11/071,762, (Aug. 1, 2008), Whole Document.

Yu, Wei, et al., On Constant Power Water-filling, IEEE, 0-7803-7097-1/01, (2001), 1665-1669.

Yu, W., "Competition and Cooperation in Multi-user Communication Environments", Dissertation Submitted to the Department of Electrical Engineering and the Committee on Graduate Studies of Stanford University, (Jun. 2002), 120 pgs.

Yu, et al., "Competitive Equilibrium in the Gaussian Interface Channel", IEEE International Symposium on Information Theory, (ISIT), (Jun. 2000), 1 pgs.

Yu, W., et al., "Distributed Multiuser Power Control for Digital Subscriber Lines", IEEE Communications, Inc., New York, US, vol. 20 No. 5; Reference No. XP-001143168, (Jun. 2002), pp. 1105-1115.

Yu, Wei, et al., "Dual Methods for Nonconvex Spectrum Optimization for Multicarrier Systems", IEEE Transactions on Communications, vol. 54, No. 7, Jul. 2006, 1310-22.

Yu, et al., "Iterative Water-filling for Gaussian Vector Multiple Access Channels", IEEE International Symposium on Information Theory, (ISIT), (2001), 1 pgs.

Yu, et al., "On Constant-Power Waterfilling", IEEE International Conference on Communications, ICC, (Jun. 2001), 5 pgs.

International Search Report and Written Opinion mailed Aug. 31, 2006 for Int'l Application No. PCT/IB2006/000824, 11pages.

International Search Report and Written Opinion mailed Aug. 10, 2006 for Int'l Application No. PCT/IB2004003960. 16 pages.

Non-Final Office Action mailed Sep. 13, 2010 for Chinese Patent Application No. 200680028879.4, 14 pages.

European Office Action mailed Feb. 10, 2011 for EP Patent Application No. 06755837.9, 4 pages.

Japanese Office Action mailed Feb. 15, 2011 for JP Patent Application No. 2006-542048, 3 pages.

European Office Action mailed Mar. 10, 2011 for EP Patent Application No. 04 801 293.4, 5 pages.

Notice of Allowance mailed Apr. 15, 2011 for U.S. Appl. No. 12/089,044, 20 pages.

Cioffi, John et al., Indication of Capability to Release of Channel Information, ANSI Contribution T1E1.4/2001-146R1, May 7, 2001, 3 pgs.

Cioffi, John et al., Iterative Waterfilling for Dynamic Spectrum Management, ANSI Contribution T1E1.4/2001-200R3, Aug. 20, 2001, 1 pgs.

Kerpez, K. et al., Advanced DSL Management, Topics in Broadband Access; IEEE Communications Magazine Sep. 2003; vol. 41, No. 11; pp. 116-123 (8 pages), XP-001177649.

First Office Action for Japanese Patent Application No. 2007-557625, Mailed May 24, 2011, 2 pages.

Office Action mailed Oct. 23, 2009 for Chinese Application No. 200480041317.4.

Non-Final Office Action for Japanese Patent Application No. 2008-521506, Mailed Jul. 5, 2011, 6 pages.

Extended Search Report for European Patent Application No. 11155157.8, Mailed Aug. 11, 2011, 9 pages.

Song, Kee Bong, et al., "Dynamic Spectrum Management for Next-Generation DSL Systems," IEEE Communications Magazine, Oct. 2002. XP002395021, pp. 101-109.

1. Requirements on good behavior

{RRDCm,ds = GOOD or ERDCm,ds = GOOD or EMDCm,ds = GOOD}
   & {RRDCm,us = GOOD or ERDCm,us = GOOD or EMDCm,us = GOOD}

2. Requirements on no bad behavior

{RRDCm,ds = GOOD/NOT_ENOUGH_DATA}
   & {ERDCm,ds = GOOD/NOT_ENOUGH_DATA}
   & {RMDCm,ds = GOOD/NOT_ENOUGH_DATA}
   & {RRDCm,us = GOOD/NOT_ENOUGH_DATA}
   & {ERDCm,us = GOOD/NOT_ENOUGH_DATA}
   & {RMDCm,us = GOOD/NOT_ENOUGH_DATA} if moving down,
   & {RCVDCn,ds = GOOD or
      RCVDCm,ds = GOOD/NOT_ENOUGH_DATA or
      ECVDCm,ds = GOOD}
   & {RNRDCn,ds = GOOD or RNRDCm,ds = GOOD/NOT_ENOUGH_DATA}

& {RCVDCn,us = GOOD or
      RCVDCm,us = GOOD/NOT_ENOUGH_DATA or
      ECVDCm,us = GOOD}
   & {RNRDCn,us = GOOD or RNRDCm,us = GOOD/NOT_ENOUGH_DATA} else (moving up or neither of moving up/down)
   & {RCVDCm,ds = GOOD or
      (RCVDCm,ds = NOT_ENOUGH_DATA and
         [FEC(n) < FEC(m) or RCVDCn,ds = GOOD]) or
      ECVDCm,ds = GOOD}
   & {RNRDCm,ds = GOOD or
      (RNRDCm,ds = NOT_ENOUGH_DATA and RNRDCn,ds = GOOD)}

& {RCVDCm,us = GOOD or
      (RCVDCm,us = NOT_ENOUGH_DATA and
         [FEC(n) < FEC(m) or RCVDCn,us = GOOD]) or
      ECVDCm,us = GOOD}
   & {RNRDCm,us = GOOD} or
      (RNRDCm,us = NOT_ENOUGH_DATA and RNRDCn,us = GOOD)}

*Figure 7*

ADAPTIVE MARGIN AND BAND CONTROL

CROSS-REFERENCE TO RELATED APPLICATIONS

This application is a continuation-in-part of U.S. patent application Ser. No. 10/893,826 filed on Jul. 19, 2004 now U.S. Pat. No. 7,558,315, entitled ADAPTIVE MARGIN AND BAND CONTROL, which claims the benefit of priority under 35 U.S.C. §119(e) of U.S. Provisional Patent Application No. 60/527,853 filed on Dec. 7, 2003, entitled DYNAMIC MANAGEMENT OF COMMUNICATION SYSTEM, the disclosures of which are incorporated herein by reference in their entirety for all purposes.

This application is a continuation of U.S. patent application Ser. No. 11/995,195 which is a national stage application of PCT/US06/26796 filed on Jul. 8, 2006 now U.S. Pat. No. 7,830,955. The PCT/US06/26796 application claims the benefit of priority under 35 U.S.C. §119(e) of the following:

U.S. Provisional Patent Application No. 60/698,113 filed on Jul. 10, 2005, entitled DSL SYSTEM, the disclosure of which is incorporated herein by reference in its entirety for all purposes; and U.S. Provisional Patent Application No. 60/723,415 filed on Oct. 4, 2005, entitled DSL SYSTEM, the disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

This invention relates generally to methods, systems and apparatus for managing digital communication systems. More specifically, this invention relates to adaptive control of various transmission parameters, including but not limited to maximum transmit power spectral density, maximum aggregate transmission power, transmission band preference, minimum and maximum receiver margin, frequency-dependent bit-loading and power controls and/or bit-loading restrictions in communication systems such as Digital Subscriber Line (DSL) systems.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line. The adaptive assignment can be continued during live data transmission on channels or lines that vary with time using a process often referred to as "bit-swapping" that uses a secure relatively low-speed reverse channel to inform the transmitter of assignment changes.

Impulse noise, other noise and other sources of error can substantially impact the accuracy of data transmitted by DSL and other communications systems. Various techniques have been developed for reducing, avoiding and/or repairing the damage done to data by such error during transmission. These error reduction/avoidance/repair techniques have performance costs for a communication system in which they are used. As is well known in the art, inadequate power transmission levels lead to errors because the transmission power is not high enough to overcome noise and other interference in a given channel. These errors lead to lost data and/or the need for re-transmission of data, sometimes multiple times. To prevent such errors, systems utilize extra transmission power that results in margins above a known or calculated signal-to-noise ratio (SNR) that assures compliance with an acceptable error rate.

Excessively high power transmission levels, however, lead to other problems. For example, use of transmission power above necessary levels means that the communication system is operated more expensively, to the detriment of all users. In addition, one or more lines' use of excessive transmission power can generate strong crosstalk problems and interference in nearby lines. Crosstalk is unwanted interference and/or signal noise electromagnetically passed between lines that share the same or adjacent binders. Crosstalk can be categorized as far-end crosstalk (FEXT) or near-end crosstalk (NEXT). FEXT is particularly detrimental in certain loop configurations with different lengths. One such situation is when a first DSL service (for example, a DSL loop or line) is deployed from a central office (CO) and a second DSL service is deployed from a remote terminal (RT), a service access interface (SAI), an optical network unit (ONU), a pedestal or any other location outside a CO. In such situations, FEXT from the CO-deployed service may cause considerable degradation to a service deployed from the non-CO location. Another strong FEXT situation arises with short to medium loop lengths, when a short line can cause strong interference into the receiver of a longer line. One such situation arises when VDSL service is deployed on loops with different lengths, in which case the FEXT crosstalk interference can be particularly strong in the upstream direction. NEXT can have a damaging effect in DSL configurations where there is some overlap between the bands used for transmission in the downstream and upstream direction, or where there is signal leakage from a downstream transmitter to an upstream receiver or vice versa.

Systems, devices, methods and techniques that allow users to adjust and adapt transmission power margin(s), power spectral densities, and the like dynamically to changing DSL environmental and operational situations would represent a significant advancement in the field of DSL operation. Moreover, monitoring and evaluation of the power, margins, etc. used in the DSL environment and operation by an independent entity can assist, guide and (in some cases) control users' activities and equipment, and likewise would represent a significant advancement in the field of DSL operation.

BRIEF SUMMARY OF THE INVENTION

Configuring or otherwise controlling, parameters of a DSL system related to power, band usage and margin is based on collected operational data. Operational data are collected for at least one DSL system operating under a known configuration and/or a profile. A target profile is selected based on binder-level information. The collected operational data is analyzed and conditions for changing the DSL system configuration to the target profile are evaluated, including any applicable transition rules pertaining to changing profiles. If the conditions hold, then the DSL system is instructed to operate with the target profile. Binder-level information can include deployment point information, topology information, and/or crosstalk coupling information. Collected operational data may include reported modem parameters and/or available modem capabilities such as bit loading procedures, DSL service priorities and others. The controlled parameters may have values that are chosen using one or more spectrum-balancing methods. Such spectrum-balancing methods may be executed infrequently, and may make use of all binder-level information that is available and/or of collected operational data.

Embodiments of the present invention include apparatus and other devices configured to execute and/or perform the above-referenced methods. For example, methods according to the present invention may be performed by a controller, a DSM Center, a "smart" modem, a DSL Optimizer, a Spectrum Management Center (SMC), a computer system and the like. Moreover, computer program products for performing these methods also are disclosed.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which:

FIG. 7 is an exemplary overall rule utilizing various sub-rules to yield a decision as to whether or not a target profile is feasible in some embodiments.

DETAILED DESCRIPTION OF THE INVENTION

Figure 1A:
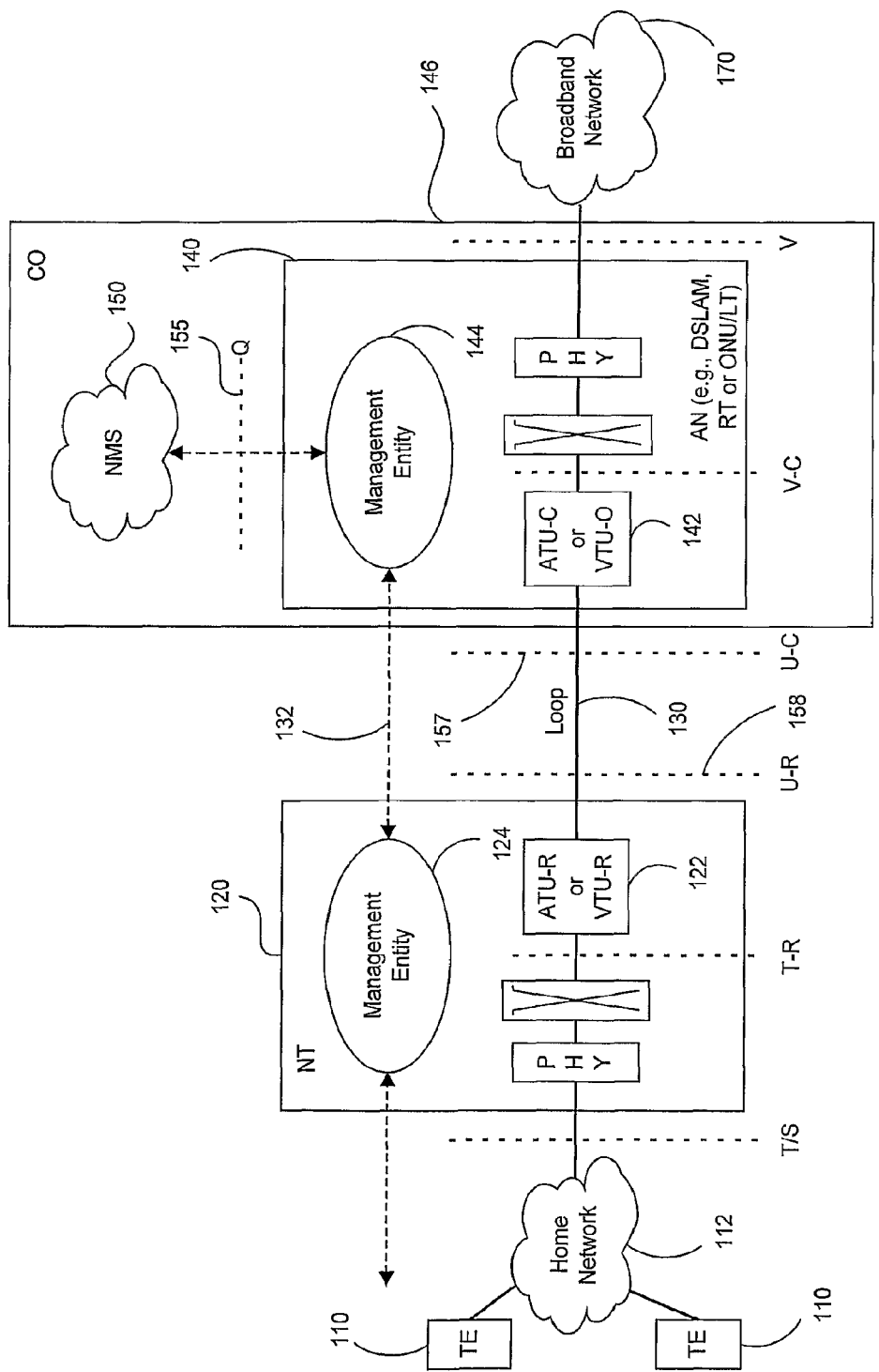
FIG. 1A is a schematic block reference model system according to the G.997.1 standard.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these illustrative embodiments.

It should be kept in mind that the specifics provided herein are for purposes of illustration and that the present invention is broader than any one example. Therefore, the present invention should be construed as broadly as possible and permitted.

Generally, embodiments of the present invention will be described in connection with the operation of a Digital Subscriber Line (DSL) system having a controller (for example, a computer system or control processor, which may or may not be embedded into a Digital Subscriber Line Access Multiplexer (DSLAM) or DSL Access Node or other network element, a "smart" modem, a dynamic spectrum manager, a DSL optimizer, a Spectrum Management Center (SMC), and/or a Dynamic Spectrum Management Center (DSM Center) as described in publications and other documents relating to this field, or any other suitable control device and/or entity, including a computer system). When the term "controller" is used herein, it is intended to mean any or all of these or any other suitable control means. A controller may be a single unit or combination of components that are a computer-implemented system, device or combination of devices that perform the functions described below.

As will be appreciated by those skilled in the art, after reading the present disclosure, embodiments of the present invention may be adapted to operate in various DSL and other communication systems known to those skilled in the art. A dynamic spectrum manager or other controller managing a communication system using one or more embodiments of the present invention may be a service provider and/or operator (which in some cases may be a CLEC, ILEC or other service provider) or may be a party partially or completely independent of the system operator(s).

Generally, when more parameters are monitored and adjustable in a DSL system, rather than being statically set, performance can be improved, often dramatically (for example, higher data rates can be realized, more users can be serviced, less power may be consumed, etc.). That is, if system settings are set adaptively as a function of the performance history and other information about a line or channel, adaptive changes to system operation can improve the data rates and other service for users. Systems according to embodiments of the present invention that accept and analyze more inputs and become, in essence, dynamic functions of a few parameters based on the observation and processing of the many other observed parameters and history of the line performance constitute a significant improvement in this field.

To reduce performance problems of various types, including crosstalk interference, many communication systems limit the power that may be used by transmitters sending data within a given system. The margin of a transmission system is the level of transmit power (typically expressed in dB) over the minimum power needed to achieve a desired performance (for example, a threshold bit error rate, or BER, of the system). The basic goal is to use sufficient power to overcome and/or compensate for noise-induced errors and interference-induced errors, while minimizing the power needed for transmission to reduce the potential problems occasioned by excessive levels of transmission power. In many cases, however, equipment manufacturers, system operators and others use such excessive power (leading to excessive margins) in an effort to provide high data rates and to take a simplistic approach to dealing with potential problems like crosstalk.

The present invention uses information about DSL line characteristics (for example, operational data, knowledge of DSL modem capabilities, etc.) to evaluate more carefully acceptable problem/interference avoidance, mitigation, reduction, etc. and data rates in power-adaptive systems and methodologies. This more careful evaluation analyzes the available information and/or operational data and then trains and sets modems to operate at power transmit levels (and thus margins) that will provide sufficient power for acceptable data transmission while minimizing the deleterious effects that electromagnetically radiated crosstalk from one user's line might have on other users' lines. More specifically, embodiments of the present invention can generate margin-related and/or power-related parameters and instruct at least one modem in a modem pair to use one or more such margin-related and/or power-related parameters to assist the modem pair in meeting a given margin target and/or in reducing the radiated crosstalk on other modem pairs. A "margin-related parameter" can include (but is not necessarily limited to) parameters for line configuration and parameters for channel configuration as defined in the ITU-T G.997.1 (G.ploam) recommendation. The margin-related parameter may also include controls as defined in the draft ATIS Dynamic Spectrum Management Technical report, NIPP-NAI-028R2. Finally, the margin-related parameter may include controls such as target SNR margin per tone, bit-cap per tone, margin cap mode, PREFBAND and others.

In embodiments of the present invention, configuration and/or other control of DSL system parameters related to power, band usage and margin is based on collected operational data. Operational data are collected from one or more DSL systems operating with one or more current and/or known configurations (also referred to as profiles), and may include reported parameter values such as line failure parameters, line inventory parameters, line/channel/data path performance monitoring parameters, line/channel test, diagnostics and status parameters. Operational data may also include reported, indicated, advertised, or otherwise known modem capabilities including bit loading procedures, modem service priorities, modem compliance with certain rules and others. A target and/or potential profile is selected based on binder-level information (for example, from a set of profiles that are allowed based on the binder-level information). The collected operational data is analyzed and conditions for changing the DSL system configuration to the target profile are evaluated. If the conditions hold (that is, if the target profile is available, for example in light of collected operational data, profile transition rules, etc.), then the DSL system is instructed to operate with the target profile. The process of evaluating conditions may be repeated for multiple target profiles. Embodiments of the present invention can be used in connection with ADSL1, ADSL2, ADSL2+, VDSL1, VDSL2 and other types of DSL systems and equipment.

A controller also can collect the binder-level information from a system of the service provider or network operator, such as an Operations Support System, a wire-map database, a topology information database including those that may be available generally on public internet search engines, a Geographic Information System (GIS) database, a DSM center database, or any other suitable source. Binder-level information can include deployment point information, topology information, and/or crosstalk coupling information. Controlled parameters can include a PSD-related or power-related value, such as the MAXNOMPSD or MAXNOMATP parameter used by various DSL systems. In some embodiments, the controlled parameters may be a shaped spectral mask for use in transmissions and/or may be caps or limits on bit loading for frequencies used in transmissions between the modems. In some cases, preferred bands can be imposed to direct modems to favor and/or avoid certain frequencies.

The operational data may include historical data relating to prior performance of the DSL system. The historical data may be maintained in a database, library, etc. The operational data may further include data collected from the broader system in which the DSL system operates, for example from one or more MIBs or other data sources. The operational data may be sent to the controller by communication means internal and/or external to the DSL system itself. Some other types of operational data that can be evaluated include data pertaining to data rate, maximum attainable data rate, margin, code violations and Forward Error Correction (FEC) corrections of the DSL system and of its neighboring DSL systems. Additional operational data may include indications of modem capabilities or of modem features or of modem modes of operation. Modems may report such indications at various stages during DSL modem initialization such as "handshake" (as explained in the ITU-T recommendation G.994.1 or G.HS). Such indications may be provided during normal modem operation ("showtime") via messages sent over the modem's embedded operations channel and reported to the network management systems or Spectrum Management Centers over interfaces such as defined in ITU-T Recommendation G.997.1 (also know as G.PLOAM). Alternately, modem capabilities for various modem types (identified by equipment manufacturer, chipset manufacturer, firmware version, serial number and others) may be known from databases, libraries, etc. The controlled parameters may have values that are chosen through known spectrum-balancing methods. In some embodiments such methods are advantageously executed infrequently, making use of all binder-level information that is available.

FIG. 1A shows a reference model system, with which embodiments of the present invention can be used, according to the G.997.1 standard (also known as G.ploam), which is well known to those skilled in the art. This model applies to all DSL systems meeting the various standards that may or may not include splitters, such as ADSL1 (G.992.1), ADSL-Lite (G.992.2), ADSL2 (G.992.3), ADSL2-Lite G.992.4, ADSL2+(G.992.5) and the G.993.2 VDSL2 standard. This model can also be applied to the G.993.1 VDSL1 standard, as well as to the G.991.1 and G.991.2 SHDSL standards, and to any DSL system with and without bonding. This model is well known to those skilled in the art.

The G.997.1 standard specifies physical layer management for DSL transmission systems based on the clear, embedded operation channel (EOC) defined in G.997.1 and use of indicator bits and EOC messages defined in G.99.times. standards. Moreover, G.997.1 specifies network management elements content for configuration, fault and performance management. In performing these functions, the system uses a variety of operational data (which includes performance data) available at an access node (AN).

In FIG. 1A, users' terminal equipment 110 (sometimes also referred to as "customer premises equipment" or CPE) is coupled to a home network 112, which in turn is coupled to a network termination unit (NT) 120. NT 120 includes an ATU-R 122 (for example, a transceiver defined by one of the DSL standards) or any other suitable network termination modem, transceiver or other communication unit. NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores, among other things, operational data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other central location. In FIG. 1A, ATU-C 142 is located at an access node (AN) 140 in a CO 146. An ME 144 likewise maintains an MIB of operational data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL typically is a telephone twisted pair that also carries other communication services.

Several of the interfaces shown in FIG. 1A are used for determining and collecting operational data. The Q-interface 155 provides the interface between the Network Management System (NMS) 150 of the operator and ME 144 in AN 140. Such an NMS may contain within or may be connected to a DSM Center, DSL optimizer, or any other controlling entity of the type in this invention. The G.997.1 standard specifies parameters that apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the operations, administration and maintenance (OAM) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2). The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational data maintained in their respective MIBs.

The DSL manager, controller, DSM Center, DSL optimizer, etc. may be an integral part of an Access Node or DSLAM. The control function may be integrated into a network element such as a DSLAM (for example in its control processor) or may be in separate management element. The control processor of the DSLAM may control several 'smart' modems.

Figure 1B:
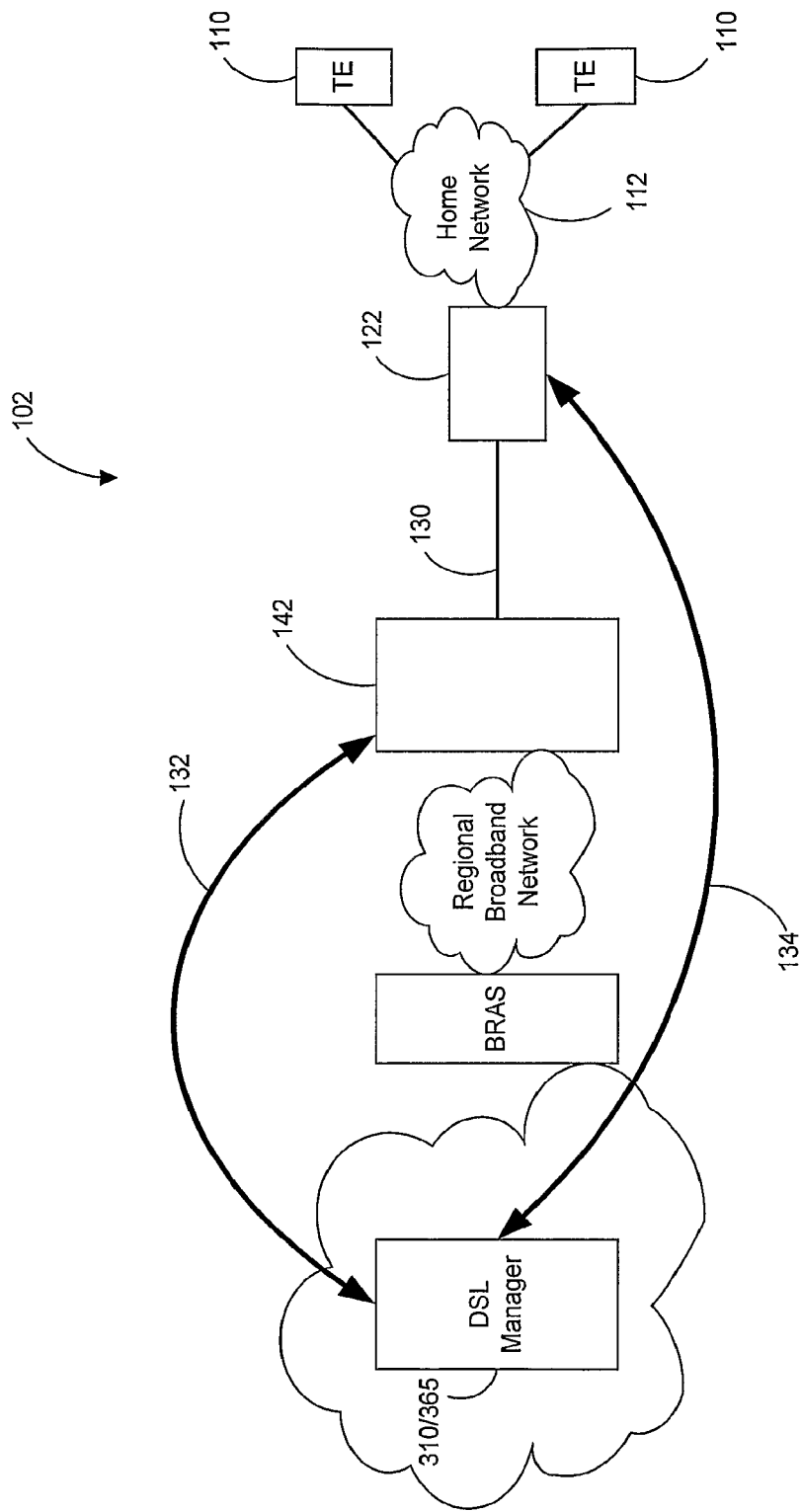
FIG. 1B is another schematic block reference model system.

Another interface for physical layer management is shown in FIG. 1B, which illustrates an augmented DSL system 102 that uses as a basis the positioning diagram from the DSL Forum technical report TR-069. FIG. 1B includes one or more CPE side devices 110 that may be coupled to a CPE modem or other DSL device 122 by a LAN 112. Modem 122 is coupled to a DSLAM or other upstream DSL device 142 by a twisted pair or other suitable DSL connection 130. A DSL Manager 310/365 (for example, a controller, DSL management entity, a DSL optimizer, a DSM Center, control software, etc.) is coupled to the DSLAM 142, for example through the Regional Broadband Network. The DSL Manager 310/365 may include as its components an Auto-Configuration-Server and a Service Configuration Manager, and may have one or more "southbound" or downstream interfaces. In FIG. 1B, however, the southbound interfaces 132, 134 couple the DSL Manager 310/365 to the CPE DSL device 122 and the DSLAM 142. Other interfaces according to embodiments of the present invention are possible, as discussed in more detail below.

More information can be found regarding DSL NMSs in DSL Forum Technical Report TR-005, entitled "ADSL Network Element Management" from the ADSL Forum, dated March 1998, which is well known to those skilled in the art. Also, as noted above, DSL Forum Technical Report TR-069, entitled "CPE WAN Management Protocol" dated May 2004 is well known to those skilled in the art. Finally, DSL Forum Technical Report TR-064, entitled "LAN-Side DSL CPE Configuration Specification" dated May 2004 is well known to those skilled in the art. These documents address different situations for CPE side management. More information about VDSL can be found in the ITU standard G.993.1 (sometimes called "VDSL1") and the ITU standard G.993.2 (sometimes called "VDSL2"), as well as several DSL Forum working texts in progress, all of which are known to those skilled in the art. Additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) and Technical Report TR-106 entitled "Data Model Template for TR-069 Enabled Devices," as well as in the revisions of ITU standard G.997.1 for VDSL1 and VDSL2 MIB elements, or in the ATIS North American Draft Dynamic Spectrum Management Technical Report, NIPP-NAI-2006-028R2. Further information may be found in the DSL Forum draft working texts WT-105 entitled "Testing & Interoperability: ADSL2/ADSL2plus Functionality Test Plan" and WT-115 entitled "Testing & Interoperability: VDSL2 Functionality Test Plan" and WT-121 entitled "DSL Home Technical: TR-069 Implementation Guidelines" and DSL Forum TR-098 "DSL-Home™ Gateway Device Version 1.1 Data Model for TR-069."

As will be appreciated by those skilled in the art, at least some of the parameters described in these documents can be used in connection with embodiments of the present invention. Moreover, at least some of the system descriptions are likewise applicable to embodiments of the present invention. Various types of operational data available from a DSL NMS can be found therein; others may be known to those skilled in the art.

In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk because it is far from other active pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
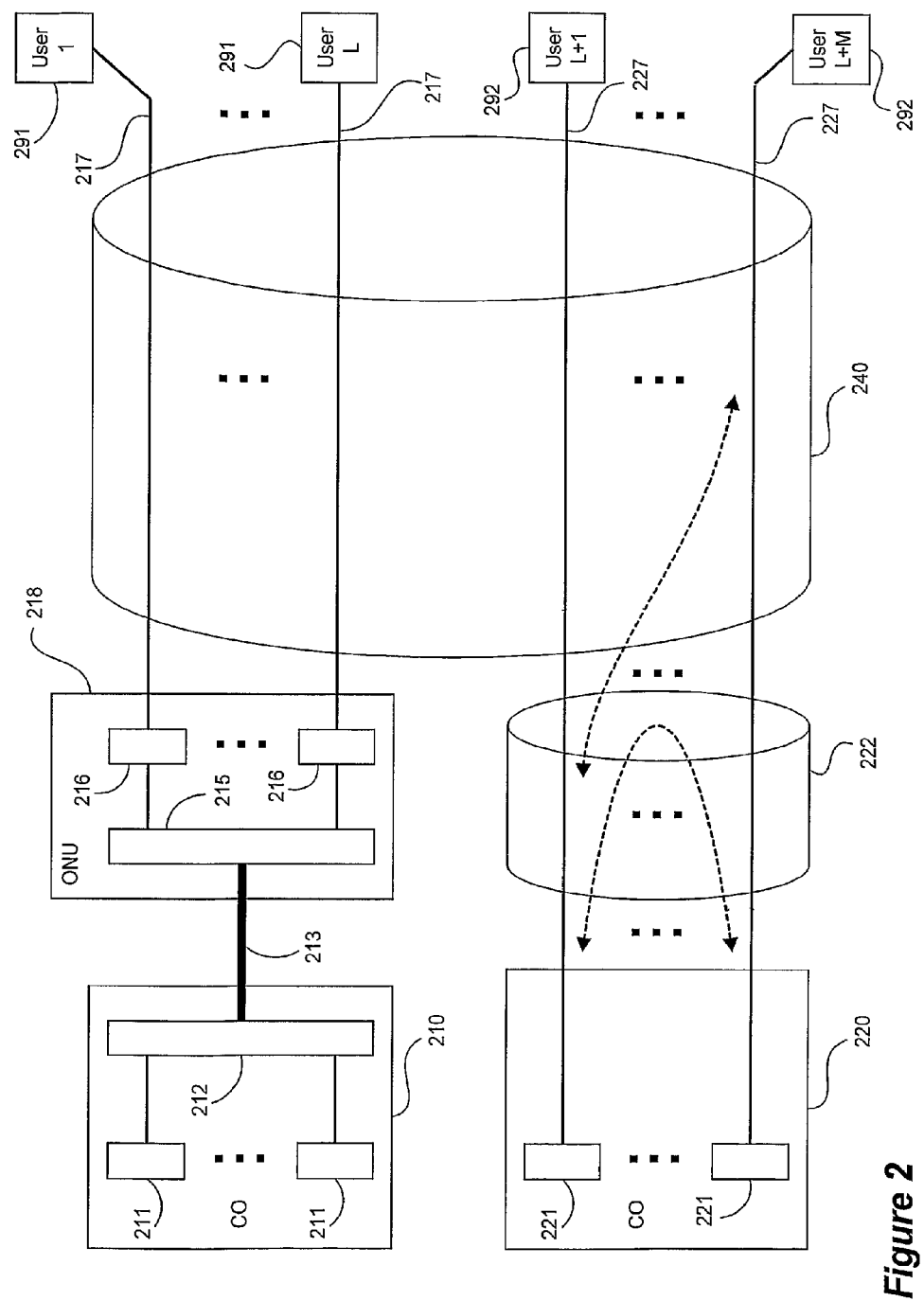
FIG. 2 is a schematic block diagram illustrating a generic, exemplary DSL deployment.

A generic, exemplary DSL deployment scenario in which embodiments of the present invention can be used is shown in FIG. 2. All the subscriber loops of a total of (L+M) users 291, 292 pass through at least one common binder. Though the loops in FIG. 2 are shown as approximately the same length, it is more likely that the loops of a given system would be of varying lengths, and in some cases widely varying lengths. Each user is connected to a Central Office 210, 220 through a dedicated line. However, each subscriber loop may be passing through different environments and mediums. In FIG. 2, L users 291 are connected to CO 210 using a combination of optical fiber 213 and twisted copper pairs 217, which is commonly referred to as Fiber to the Cabinet (FTTCab) or Fiber to the Curb. Signals from transceivers 211 in CO 210 have their signals converted by optical line terminal 212 and optical network terminal 215 in CO 210 and optical network unit (ONU) 218, which may also be referred to as a remote terminal (RT). Modems 216 in ONU 218 act as transceivers for signals between the ONU 218 and users 291.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. The existence of FTTCab loops can create problems to FTTEx loops. Moreover, FTTCab is expected to become an increasingly popular topology in the future. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder. Users L+1 to L+M could be a Remote terminal (instead of CO) and the users 1 to L could be even closer to customers, perhaps serviced by a line terminal or some other fiber fed terminal (thus two fiber fed terminals with one closer to customers than the others). As can be seen in FIG. 2, the lines from CO 220 to users 292 share the binder 222, which is not used by the lines between CO 210 and users 291. Moreover, another binder 240 is common to all of the lines to/from CO 210 and CO 220 and their respective users 291, 292.

Figure 3A:
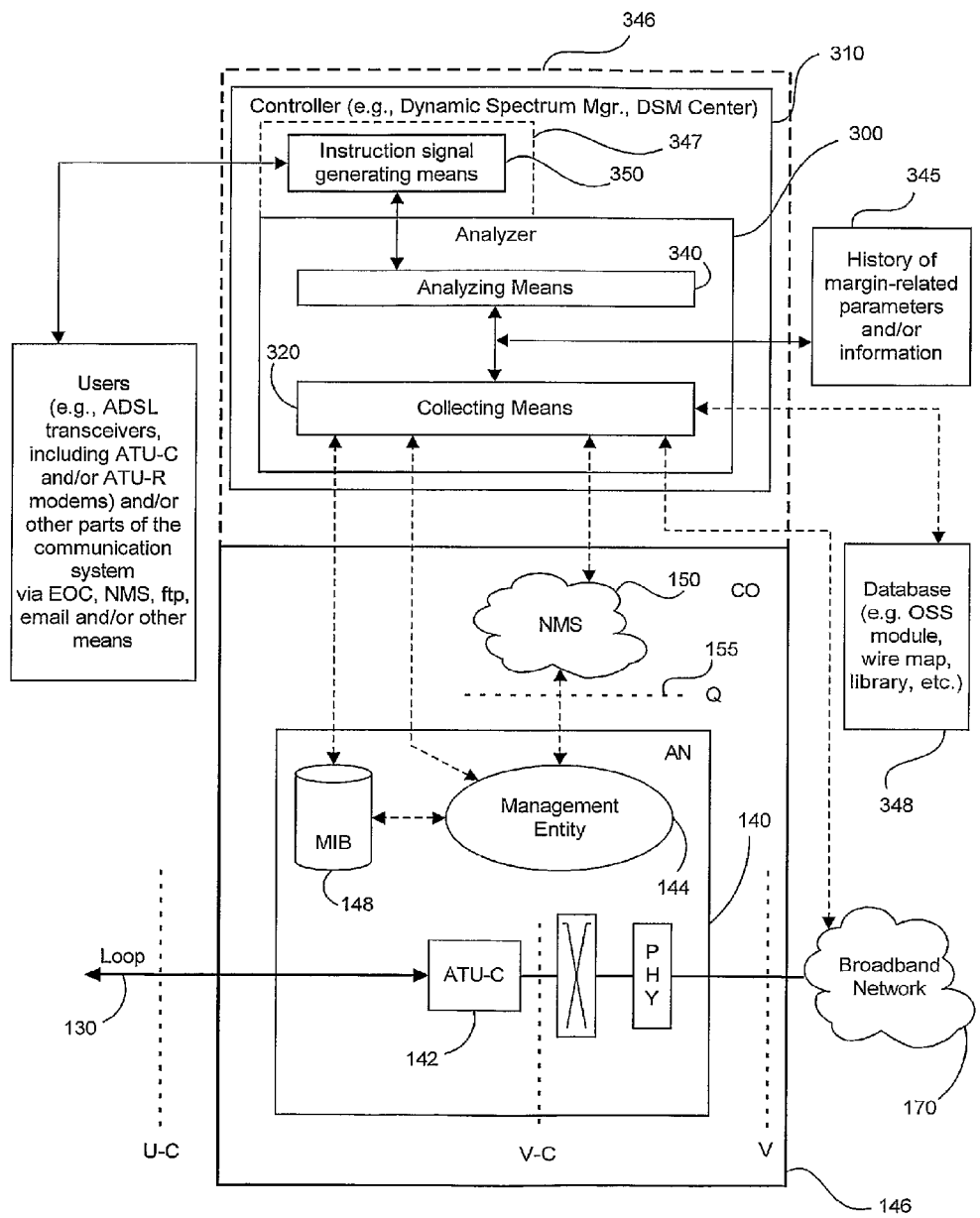
FIG. 3A is a controller including a model-based control unit according to one embodiment of the present invention.

According to one embodiment of the present invention shown in FIG. 3A, an analyzer 300 may be part of an independent entity monitoring one or more DSL systems as a controller 310 (for example, a DSL optimizer, a dynamic spectrum manager or dynamic spectrum management center) assisting users and/or one or more system operators or providers in optimizing or otherwise controlling their use of the system. (A dynamic spectrum manager may also be referred to as a Dynamic Spectrum Management Center, DSM Center, DSL Optimizer, Spectrum Maintenance Center or SMC.) In some embodiments, the controller 310 may be operated by an ILEC or CLEC operating DSL lines from a CO or other location. In other embodiments, a "smart" modem unit can have a controller (having, for example, a processor and memory) integrated with the modem in a user location, a central office or some other single location. As seen from the dashed line 346 in FIG. 3A, controller 310 may be in or part of the CO 146 or may be external and independent of CO 146 and any party operating within the system. Moreover, controller 310 may be connected to and/or controlling multiple COs. Likewise, components of controller 310 may or may not be in the same location and/or equipment, and/or may instead be accessed by the controller at different locations.

In the exemplary system of FIG. 3A, the analyzer 300 includes collecting means 320 (which also may perform monitoring, if desired) and analyzing means 340. As seen in FIG. 3A, the collecting and/or monitoring means 320 may be coupled to and may collect data through and from sources internal to a DSL system, such as NMS 150, ME 144 at AN 140 and/or the MIB 148 maintained by ME 144. Data also may be collected from external sources by means 320 through the broadband network 170 (for example, via the TCP/IP protocol or other means outside the normal internal data communication systems within a given DSL system). Also, the collecting means 320 may have access to one or more databases or other sources 348, storing binder-level information, such as deployment information, topology information, crosstalk coupling, etc, or information about modem capabilities, such as procedures for bit loading and power allocation, and service priorities. The controller may collect operational data from an ATU-R over the internet or even from an ATU-C over the internet if the EMS bandwidth is limited or if the EMS is uncooperative (for example, by blocking reported management data because the equipment manufacturer wishes to perform the management internally to its equipment). Operational data also can be collected from the NMS of the service provider, which may be collecting from various sources itself.

Analyzing means 340 and/or monitoring/collecting means 320 may also be coupled to a source 345 of margin-related parameter history and/or other such related information, such as a database or memory that may or may not be part of the analyzer 300 or controller 310. One or more of the analyzer's connections allows the analyzer 300 to collect operational data. Data may be collected once (for example, during a single transceiver training) or over time. In some cases, the monitoring means 320 will collect data on a periodic basis, though it also can collect data on-demand or any other nonperiodic basis, thus allowing the analyzer 300 to update its user and line data, if desired.

The analyzing means 340 is capable of analyzing data provided to it to determine whether instructions need to be sent to one or more modems to assist the modems in meeting a given margin target or in reducing the crosstalk induced on modems of neighboring lines. The analyzing means 340 of analyzer 300 is coupled to an instruction-signal generating means 350 in the controller 310. Signal generator 350 is configured to accept a margin-related or power-related parameter value generated by the analyzing means 340 for use by a modem, where the margin-related or power-related parameter value is based on the operational data and is calculated to assist at least one modem in meeting a margin target or in reducing induced crosstalk. Signal generator 350 is configured to send instruction signals (for example, a requested or required MAXNOMPSD value, PSDMASI setting or other instructions such as CARMASK, MAXSNRM, MINSNRM, TARSNRM, tone-dependent TARSNRM, MAXNOMATP, MAXRXPWR, tone-dependent BCAP, minimum/maximum net data rate, margin cap mode, service priorities or any of the rate-adaptive margins or timers) to users in the communication system (for example, ADSL transceivers such as ATU-Cs). As indicated by the dashed line 347, the instruction signal generating means 350 may or may not be part of the analyzer 300 and/or be implemented in the same hardware, such as a computer system. Instruction signal generator 350 constitutes a means for regulating one or more margin-related parameter values in the modem pair.

Figure 3B:
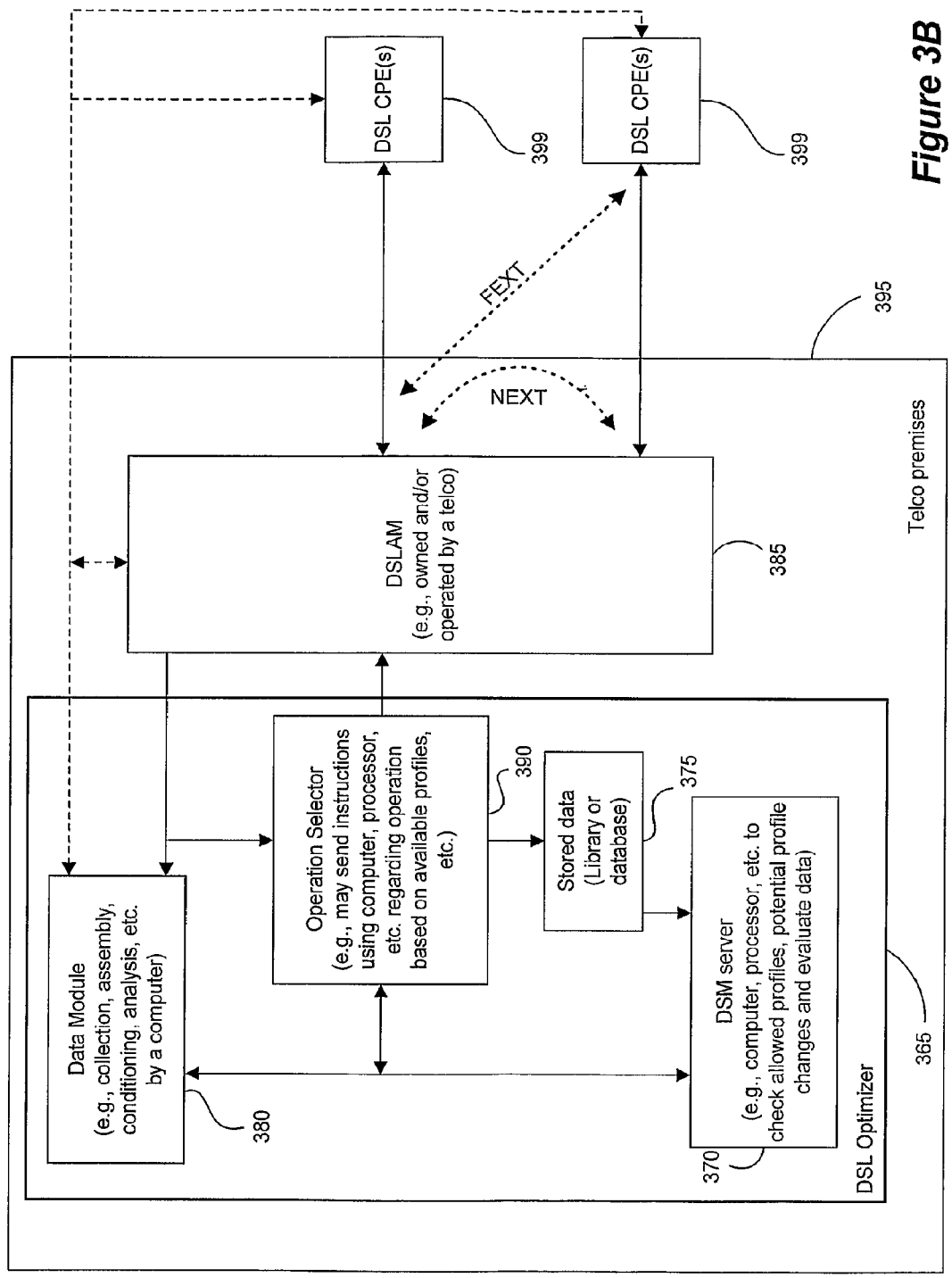
FIG. 3B is a DSL optimizer according to one embodiment of the present invention.

Another embodiment of the present invention is shown in FIG. 3B. A DSL optimizer 365 operates on and/or in connection with a DSLAM 385 or other DSL system component (for example, an RT, ONU/LT, etc.), either or both of which may be on the premises 395 of a telecommunication company (a "telco"). The DSL optimizer 365 includes a data module 380, which can collect, assemble, condition, manipulate and/or supply operational data for and to the DSL optimizer 365. Module 380 can be implemented in one or more computers such as PCs, workstations, or the like. Data from module 380 is supplied to a DSM server module 370 for analysis (for example, determining the availability of profiles, transitions to be implemented, etc. based on collected operational data for given communication lines, control and operational changes to the communication system, reported modem capabilities, etc.). Information also may be available from a library or database 375 that may be related or unrelated to the telco.

An operation selector 390 may be used to implement signals affecting operation of the communication system. Such decisions may be made by the DSM server 370 or by any other suitable manner, as will be appreciated by those skilled in the art. Operational modes selected by selector 390 are implemented in the DSLAM 385 and/or any other appropriate DSL system component equipment. Such equipment may be coupled to DSL equipment such as customer premises equipment 399. Device 385 can be used to implement any ordered changes based on allowable profiles, performance enhancement, etc. considered by the DSL optimizer 365. The system of FIG. 3B can operate in ways analogous to the system of FIG. 3A, as will be appreciated by those skilled in the art, though differences are achievable while still implementing embodiments of the present invention.

The collecting means 320 or the data module 380 also may be coupled to the corresponding modules of a second controller or DSL optimizer. Thus, operational data can be collected from other DSL lines, even when they are not controlled by the same DSL optimizer, DSM center or SMC. Conversely, a controller 310 or DSL optimizer 365 may provide operational data of its own DSL lines to a public or private database (for example, a public or privately controlled web site or connection where DSL management entities can share data appropriately) for appropriate use by regulators, service providers and/or other DSL optimizers.

As will be appreciated by those skilled in the art, if the controller is a wholly independent entity (that is, not owned and/or operated by the company owning and/or operating lines within the CO), much of the DSL system's configuration and operational information may be unavailable. Even in cases where a CLEC or ILEC operates and/or functions as the controller 310, much of this data may be unknown. Various techniques may be used for estimating needed data and/or information. Examples of such techniques can be found in the following:

U.S. Ser. No. 10/817,128, entitled DSL SYSTEM ESTIMATION AND PARAMETER RECOMMENDATION, filed Apr. 2, 2004;

U.S. Ser. No. 11/069,159, entitled DSL SYSTEM ESTIMATION INCLUDING KNOWN DSL LINE SCANNING AND BAD SPLICE DETECTION CAPABILITY, filed Mar. 1, 2005;

U.S. Ser. No. 11/122,365, entitled FEXT DETERMINATION SYSTEM, filed May 5, 2005;

U.S. Ser. No. 11/342,024, entitled DSL SYSTEM ESTIMATION AND CONTROL, filed Jan. 28, 2006;

U.S. Ser. No. 11/342,028, entitled BINDER IDENTIFICATION, filed Jan. 28, 2006; all of which are owned by ADAPTIVE SPECTRUM AND SIGNAL ALIGNMENT (ASSIA), Inc., and all of which are incorporated by reference in their entireties for all purposes.

Figure 8:
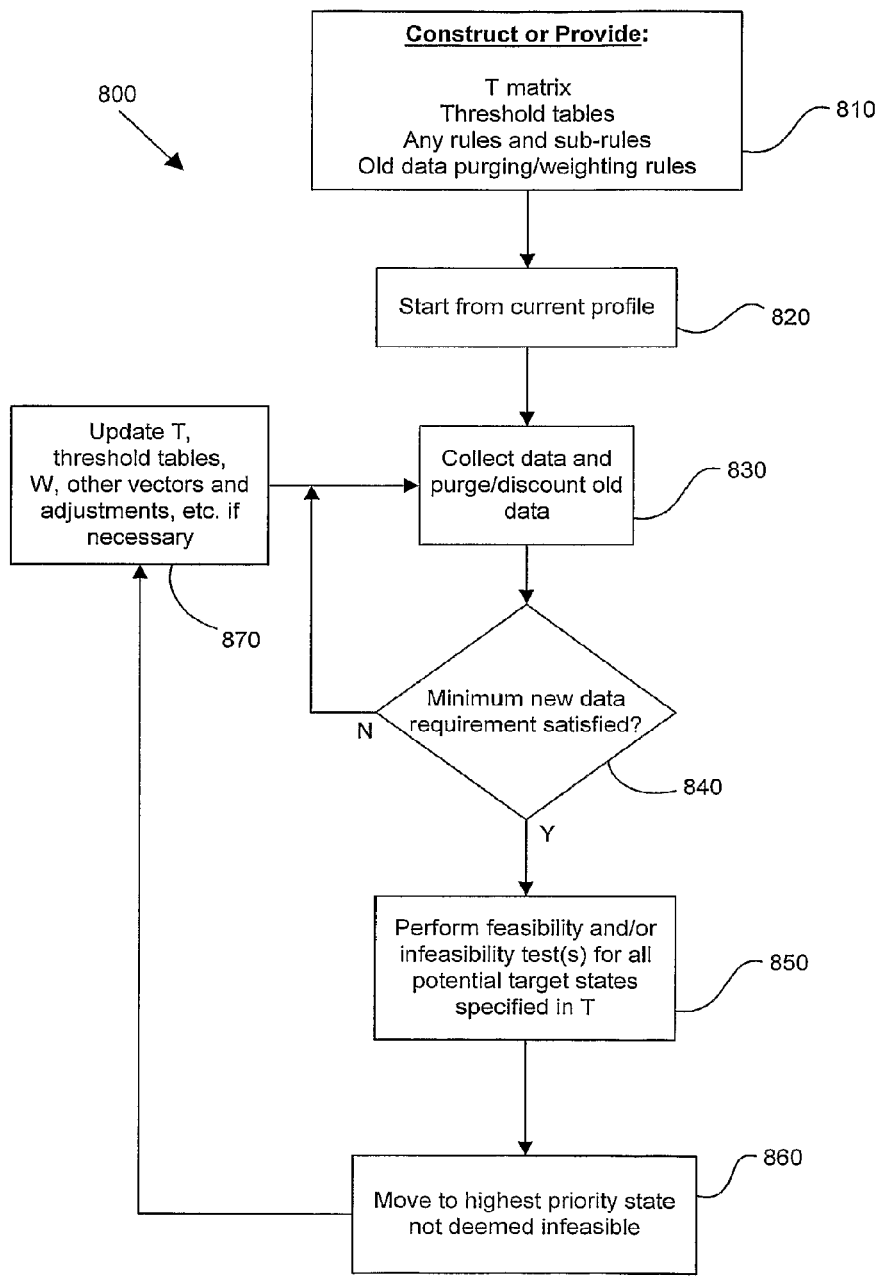
FIG. 8 is a flow diagram showing one or more embodiments of the present invention in which transitioning operation of a DSL line or other communication line from a current state to one or more target states is evaluated.

In some embodiments of the present invention, the analyzer 300 may be implemented in a computer such as a PC, workstation or the like (one example of which is disclosed in connection with FIG. 8). The collecting means 320, analyzing means 340 and/or instructing signal generating means 350 may be software modules, hardware modules or a combination of both, as will be appreciated by those skilled in the art. These components may all reside in the same computer system, for example, or may be in distinct apparatus. For management of large numbers of lines, databases may be introduced and used to manage the volume of data generated by the lines and the controller.

Figure 4:
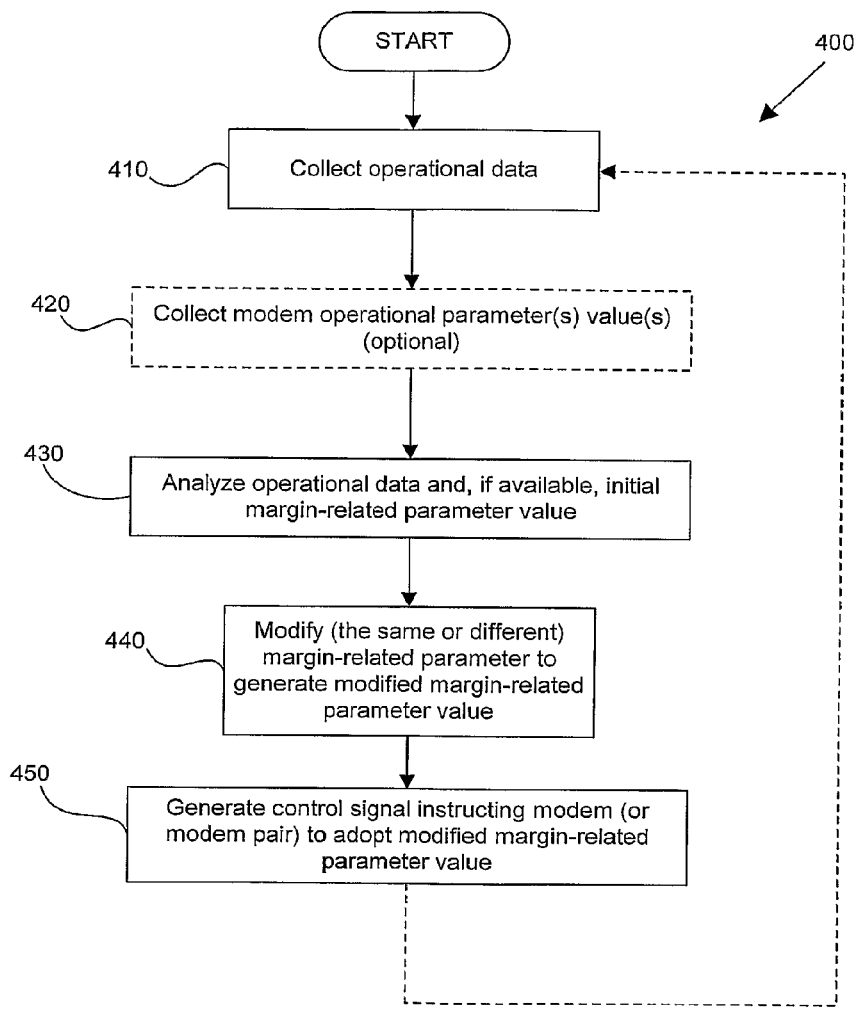
FIG. 4 is a flow diagram of methods according to one or more embodiments of the present invention.

Generally, as shown in the example of FIG. 4, in a method 400 according to one embodiment of the present invention, a controller collects operational data (typically relating to the DSL modem pair of interest) at 410. The operational data may include historical margin performance of the DSL system, historical performance data (such as previously measured and known margin levels for the modem pair and other performance-related information), current performance data relating to the DSL modem, retrain-count data, other data relating to training of the modem, or error data. The operational data may include line/channel/data path performance monitoring parameters, line/channel test parameters, diagnostics parameters, status parameters, line failures and line inventory parameters.

The operational data may include an indication of the modem capabilities or of modem features or of modem configurations related to bit loading and power allocation across tones. For some DSL modem implementations, the bit loading/power allocation algorithms used may be such that the margin per tone is at a very high level for certain tones/frequencies, but has a smaller value in other tones/frequencies. However, the average reported margin will be dominated by the margin per tone with the smallest value. Thus, the average reported margin may be found to be smaller than the maximum allowed margin (MAXSNRM), even though a large number of tones may actually have excessive margin values, and therefore induce excessive crosstalk. Other DSL modem implementations may use a stricter interpretation of MAXSNRM and their algorithms may require that the MAXSNRM parameter should apply to the margin on any used tone. Such DSL modem implementations have the advantage of minimizing the excess transmitted power and induced crosstalk across all tones, and may indicate this capability to a controller, DSL optimizer, Dynamic Spectrum Manager, etc. in an appropriate way. Such capability is also referred to as PREFBAND or margin cap mode "enabled."

Other indications of modem capabilities may include the support of new service priorities. Modems select their transceiver parameters based on certain service requirements such as meeting a minimum net data rate, or meeting a maximum delay, or meeting a minimum impulse noise protection. Traditionally, modems select their transceiver parameters with the following priorities: first maximize net data rate, then minimize excess (average) margin with respect to MAXSNRM (as explained, for example, in ITU-T recommendation G.993.2, VDSL2). Modems may choose to support an alternative prioritization, such as first maximizing net data rate, then minimizing excess margin per tone with respect to MAXSNRM. Other prioritizations may include minimizing the delay, or maximizing the impulse noise protection.

Such modem capabilities may be indicated to a far-end management entity through the use of the ITU-T recommendation G.994.1 (G.HS), also known as "handshake." A G.HS "code-point" may be assigned to indicate that a modem supports a certain capability. Alternately, an indication may be communicated to a far-end management entity by an appropriate message exchanged during DSL initialization (such as in the O-SIGNATURE or in the R-MSG1 messages exchanged during "Channel Discovery" of the ITU-T Recommendation G.993.2, VDSL2). Such indications may be available to a DSM center, DSL optimizer, controller, etc. (for example, through a near-end or far-end management entity) which then can make use of such indications in controlling one or more margin/power-related parameters of a DSL modem to assist with meeting a target margin and/or reducing the induced crosstalk. The DSM center may also control modem capabilities, in order to enable/disable modem features, processes, algorithms, etc.

In another embodiment of the present invention, the modem capabilities may not be directly indicated to the controller, DSL optimizer, DSM center, etc., but it may be able to identify the modem type, which might include information such as system vendor, chipset vendor, hardware revision, firmware version, serial number and others. Stored information (for example, look-up tables, etc.) about the modem capabilities of various modem types may then be used by the DSM center in order to learn the capabilities of a modem managed by the DSM center. Examples of such techniques can be found in U.S. Ser. No. 10/981,068, filed Nov. 4, 2004, entitled COMMUNICATION DEVICE IDENTIFICATION, which is owned by ASSIA, Inc., and which is incorporated by reference in its entirety for all purposes.

Data may be collected using the DSL system's internal communication system(s) and/or using external communication (for example, the internet). The operational data might include information regarding one or more modem operational parameter values being used or set by the modem pair, which is collected at 420.

At 430 the controller analyzes the operational data to determine what margin-related parameter values might assist the modem pair in meeting a margin target or otherwise enhance performance of the modem pair. The controller may then generate a margin-related parameter value at 440. The margin-related parameter value may be for a modem operational parameter that the controller has considered or may be a different margin-related parameter. At 450 the controller generates an instruction signal representing the margin-related parameter value and sends that to at least one modem in the modem pair, thus instructing the modem pair to adopt the margin-related parameter value for use in training or in normal operation, depending on the circumstances. A margin-related parameter may include parameters for line configuration and parameters for channel configuration as defined in the ITU-T G.997.1 (G.PLOAM) recommendation. The margin-related parameter may also include controls as defined in the draft ATIS Dynamic Spectrum Management Technical report, NIPP-NAI-028R2. Finally, the margin-related parameter may include controls such as target SNR margin per tone, bit-cap per tone, margin cap mode, PREFBAND and others.

Figure 5:
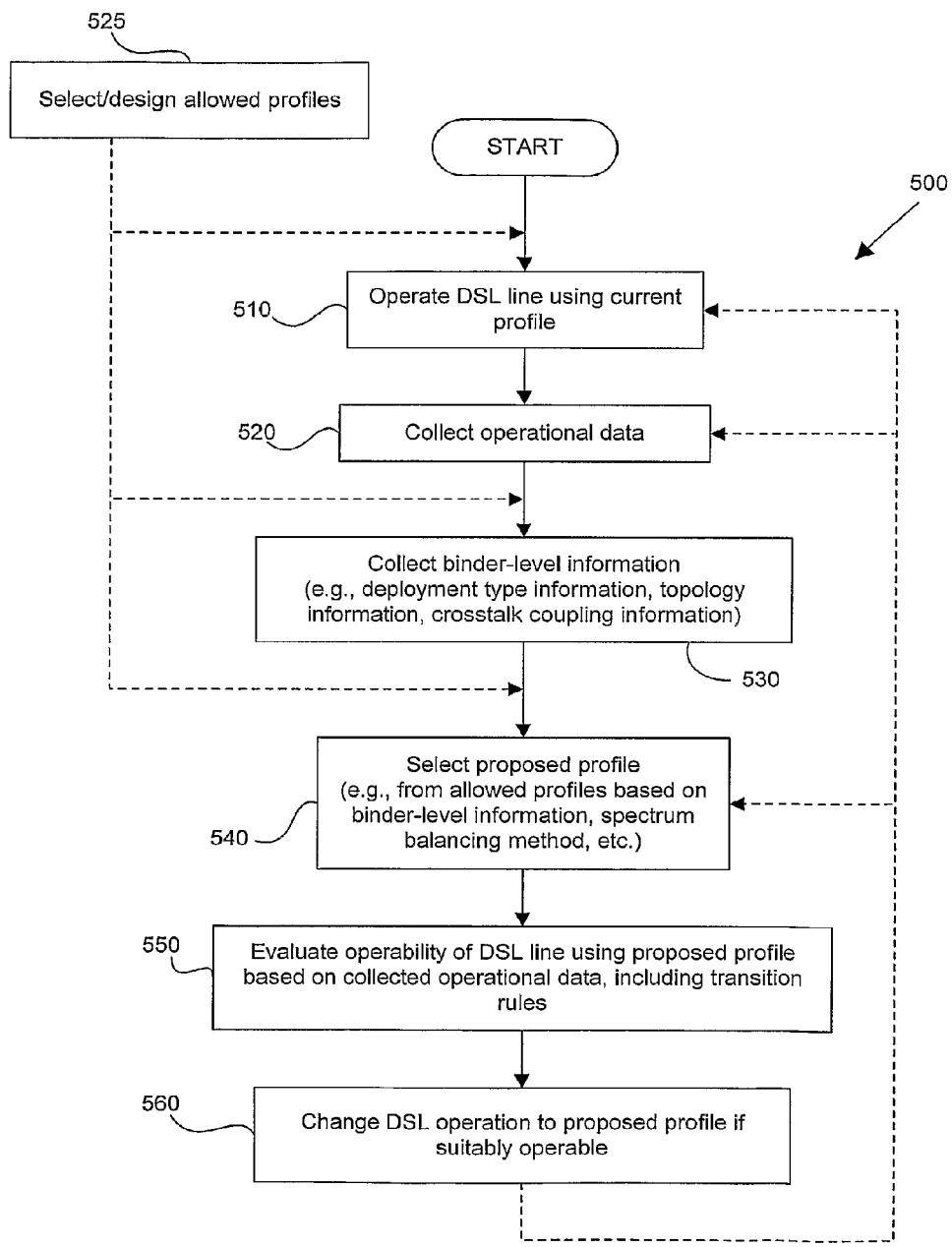
FIG. 5 is another flow diagram of methods according to one or more embodiments of the present invention.

Another embodiment of the present invention is shown in FIG. 5. Method 500 begins with a first DSL system operating using a first profile as a current profile at 510. Operational data is then collected at 520 (for example, by a controller or the like). The operational data can be operational data pertaining to operation of the first DSL line/system, but also can include operational data collected from one or more neighboring DSL systems (that is, DSL systems in close physical proximity to the first DSL system). Operational data collected at 520 may be similar as those collected at 410 and 420. Also, binder-level information is collected at 530. The binder-level information, as discussed in more detail below, can be deployment information, topology information, crosstalk coupling information and/or any other binder-level information that might assist in evaluating performance options and evaluating alternative profiles. This binder-level information can be actual data about binder structure and environment and/or assumed information for use in any spectrum balancing method that might be used in connection with method 500. Such spectrum balancing methods can compute or otherwise generate allowed profiles comprising configuration parameter values. A second profile is selected at 540 as a second profile. The second profile can be selected from one or more profiles designed and/or selected at 525, which design/selection can take place at any appropriate time and be updated, if desired. This second profile can be chosen from profiles that are allowable based on the collected binder-level information.

At 525 profiles as well as transition matrices, transition rules and data weightings can be designed and/or selected. Design/selection at 525 may tale into account collected operational data such as indications of modem capabilities and/or modem features. An indication that a modem is complying with a requirement to keep the SNR margin per tone smaller than the maximum SNR margin (known as PREFBAND, or margin cap mode), or an indication that a modem is using different service priorities for determining transceiver parameters such as bi, gi, FEC parameters, interleaving parameters and others can be advantageously exploited by a DSM center to determine one or more appropriate profiles.

As an example, a modem reporting or indicating a PREFBAND (or margin cap mode) capability is assured to minimize its excess margin relative to a MAXSNRM requirement. A modem reporting no such capability would be suspect of transmitting excessive power, and thus causing excessive crosstalk. According to one embodiment of the present invention, profiles are designed differently depending on the PREFBAND (or margin cap mode) indication. When PREFBAND is on, then the profiles make use of the MAXSNRM parameter:

Profile 1:
MAXSNRM=16 dB
Minimum rate=1.5 Mbps, Maximum rate=3.0 Mbps
Profile 2:
MAXSNRM=16 dB
Minimum rate=3.0 Mbps, Maximum rate=6.0 Mbps
In this case, it is assured that Profile 1 is consuming less power compared to Profile 2.

When PREFBAND is off, then the profiles must make use of other parameters to control the transmitted power, such as the MAXNOMPSD (maximum nominal PSD) parameter:

Profile 1:
MAXNOMPSD=−52 dBm/Hz
Minimum rate=1.5 Mbps, Maximum rate=3.0 Mbps
Profile 2:
MAXNOMPSD=−40 dBm/Hz
Minimum rate=1.5 Mbps, Maximum rate=3.0 Mbps In this case, the transmitted nominal PSD is forced to a smaller value in profile 1 to reduce crosstalk emissions.

At 550 the operability of the proposed/second profile is evaluated based on the collected operational data (including any profile transition rules) to determine whether the proposed profile is available from that standpoint. If the proposed profile is available after evaluation at 550, then at 560 the first DSL system is instructed to change configuration and/or operation to use the proposed profile. In cases where multiple DSL systems are under evaluation, the instructions at 560 might be to the first DSL system and/or one or more neighboring DSL systems, thus allowing mutually beneficial updating of operation of multiple users' systems. For example, another service provider's controller, DSL optimizer, etc. might be present (for instance, both could be customers of a management firm or other entity) and thus know what neighboring DSL systems are doing. This knowledge might allow each controller, DSL optimizer, etc. to benefit even though they do not otherwise correspond. After 560, the controller may return to 540 to select another proposed profile, or it may return to 510 to operate the line with the current profile.

The controller may update operation of the modem pair and/or configuration of the DSL system (for example, a DSL line or loop) by performing such an analysis more than once, as shown by the dotted arrows in FIGS. 4 and 5, or may do it only at specified times, such as immediately before modem training. As will be discussed in detail below, the parameters with which the controller works and operational data available to the controller varies, depending on the type of DSL system in which the modem pair operates. Again, the modem operational parameter(s) used by the controller in analyzing the modem margin performance may or may not be the same parameter as that for which the margin-related parameter value is generated and sent to the modem. While not limited to such types, embodiments of the present invention are helpful in assisting modems employing ADSL1, ADSL2, ADSL2+, VDSL1 and/or VDSL2. Use of the controller may assist in making sure that standards-compliant modems remain compliant. Moreover, embodiments of the present invention can be used to enhance performance of one or more DSL lines by taking into account operational data, binder-level information like crosstalk effects and other information that can have a deleterious effect on DSL performance.

Basically, a new profile may include one or more of the spectrum level, power, spectrum shape, etc. that can be changed in response to reported margin and performance history. That is, after evaluating data about prior performance of a modem pair, and knowing one or more of the modem pair's profile, margin-related parameters, etc., a controller or the like can suggest or force a modem or modem pair to adopt a new profile and/or operational values that will assist the modems in meeting one or more margin targets, and in possibly reducing the induced crosstalk.

In some embodiments of the present invention, a controller coupled to the ATU-C side of a modem pair dynamically controls profiles, margin settings and adjustments for each line (for example, in an ADSL2 system, by setting and/or changing the MAXSNRM parameter, by imposing a different MAXNOMPSD level, or by setting the PSDMASK in an ADSL2+ modem or by combinations of some or all of these, or some of the other parameters previously mentioned such as CARMASK, MAXSNRM, TARSNRM, MINSNRM, RA-margins/timers). In other embodiments, the controller may determine from a history of reported margin and/or other measurements that the line is exceeding a desired margin target and thereby impose a profile having a lower PSD level during or before training by the mechanisms discussed above. Similarly, if for some reason a modem is not using sufficient power and/or margin and is experiencing excessive noise and error problems, the controller can instruct the modem to use a profile having a higher PSD level during training or operation to permit better operation.

As noted above, it may be preferable in some systems to use a historical, previously measured and/or known margin to "seed" the training process so that an appropriate power reduction is implemented during training. The controller can maintain or have access to a performance history, thus continuously allowing the controller to improve estimates and decisions concerning what PSD or other margin-related parameters to instruct the modem to use when the modem is reset or retrains (which can be forced or recommended, if appropriate). For example, a service provider or controller may wait until the line is inactive—for example, counting ATM cells or other customer information-passing measures to know when the line is active or not—and then reset to use the newer PSD(s) in a manner completely transparent to a user. In other situations, the service provider may simply retrain at a time when the system is very unlikely to be in use (for example, in the middle of the night). In some embodiments, the controller can use this historical information, telling the one or both of the modems in the modem pair (for example, the ATU-C) what initial PSD level should be used so that an available PCB value or other adjustment (for example, a −14.5 dB drop by the ATU-R) has a chance of meeting the margin specification.

In some embodiments of the present invention, programming is based on either previous use(s) or training. The previous uses may be more important in some cases. A second pass through training, which also can be used, essentially is a quick fix for the modem vendors themselves, particularly for downstream transmission with the DSLAM vendors, where the modems can essentially stop the current training and then commence training from the beginning a second time with a different, lower NOMPSD that causes the margin then to be less than MAXSNRM. A frequency-dependent bit-cap or frequency-dependent target margin or noise (as described in T1E1.4/1992-203) also could be imposed by the controller on a second training to ensure the MAXSNRM was observed.

Several techniques are known to those skilled in the art for selecting the DSL configuration of multiple lines, when those lines cause significant crosstalk into each other. In such cases, DSL configuration parameters such as minimum/maximum data rate, minimum/target/maximum margin, PSD mask, carrier mask, maximum aggregate transmitted power, maximum received power and the like can be used to optimize the performance of the multiple lines subject to desired requirements for the DSL configuration (for example minimum data rate and margin) and subject to certain configuration constraints (for example the maximum aggregate transmitted power supported by the DSL system).

Known spectrum balancing methods and techniques include Optimum Spectrum Balancing, Iterative Spectrum Balancing, SCALE, C-NRIA and the Band Preference Algorithm. Optimum Spectrum Balancing can be found in various contributions to the T1E1.4 Working Group of ATIS, including Contributions T1E1.4/2003/325, T1E1.4/2004/459 and T1E1.4/2004/460, and in "Optimal Multiuser Spectrum Management for Digital Subscriber Lines," Proc. of the IEEE International Conference on Communications, ICC, pp. 1-5, Paris, France, June 2004. Iterative Spectrum Balancing can be found in "Low complexity near optimal spectrum balancing for digital subscriber lines," IEEE International Conf. on Communications. (ICC), Seoul, Korea, 2005, and in "Iterative Spectrum Balancing for Digital Subscriber Lines," IEEE International Communications Conference (ICC), Seoul, May, 2005. SCALE can be found in "Low-Complexity Distributed Algorithms for Spectrum Balancing in Multi-User DSL Networks", IEEE International Conference on Communications, Istanbul, Turkey, June 2006. C-NRIA can be found in "The Constrained Normalized-Rate Iterative Algorithm," 1st Conference on Computers, Communications, and Signal Processing, Kuala Lumpur, Malaysia, November 2005. Finally, the Band Preference Algorithm can be found in Section 15.4 in Chapter 15 of the course notes for Stanford University course EE479 Multiuser Digital Transmission Systems, taught at Stanford University in Fall 2005. Those skilled in the art know how to select and implement any required spectrum balancing method for use in connection with embodiments of the present invention.

Embodiments of the present invention overcome practical difficulties previously associated with using the above techniques in practical DSL systems deployed in the field. One of the main challenges in using some the above algorithms has been that they require a large amount of computation to be performed in determining transmit power spectral densities for the multiple DSL systems that achieve reduced crosstalk noise and improved performance. More importantly, DSL system environments are not static, so transmit power spectral densities need to be updated periodically to account for interferer and/or channel variations. Thus, computational requirements can easily become unmanageable, especially when jointly optimizing a large number of DSL systems.

Another earlier shortcoming overcome by embodiments of the present invention is that many of the above algorithms require the collection of parameters that might not be available from the DSL systems, or might not be within a single management system's control. For example, crosstalk information (designated as Xlog by those skilled in the art, as explained in the ATIS draft technical report on Dynamic Spectrum Management, contribution NIPP-NAI-028R2) may not be reported or computed by all DSL systems. Topological information about the location of a CO 220 relative to an ONU/RT 218 (for example, as seen in FIG. 2) may also be unavailable. Even when parameters such as channel gains per tone, noise per tone, crosstalk coupling per tone, maximum transmitted power, and the like are available, dynamically ascertaining the configuration of the DSL systems by determining the bits and gains tables (as described by some of the above algorithms) in a controller 310 and communicating the results to an access node 140 requires significant communication, especially when results require frequent updating.

Finally, embodiments of the present invention eliminate the requirement that such algorithms be executed in a centralized fashion, wherein the configuration of the DSL systems is jointly determined. This centralized approach requires that the controller 310 collects information for all managed DSL lines, determines configuration parameters such as transmit power spectral density jointly for all managed lines, and sets the configuration parameters of those managed lines at approximately the same time. There are significant obstacles to adopting this centralized approach, for example regulatory and operational issues. Considering the example of FIG. 2, CO 220 and DSL lines 227 frequently are managed by a different entity than the entity managing CO 210 and DSL lines 217. Such situations typically emerge either because multiple companies control the DSL loops or because the same company segregates its own lines into different management systems.

Embodiments of the present invention adaptively change the configuration of one or more DSL lines, which may include parameters such as the maximum nominal power spectral density (MAXNOMPSD), the maximum nominal aggregate transmit power (MAXNOMATP), the level of power cutback (PCB), the fine gains (gi), the transmit spectral scaling (tssi), the power spectral density mask (PSDMASK), the power spectral density level (PSD level), the maximum received power (MAXRXPWR), the upstream power "backoff" (UPBO) configuration, the carrier mask (CARMASK), the minimum impulse noise protection (INP), the maximum delay (DELAY), the target margin (TARSNRM), the minimum margin (MINSNRM), the maximum margin (MAXSNRM), the preference band indication (PREFBAND), the margin cap mode, the target data rate, the minimum data rate, the maximum data rate, the FEC and interleaving parameters, the per tone bit cap (BCAP[n]), the per tone target SNR margin (TSNRM[n]) and the reference noise (REFNOISE). The above parameters (and possibly others well known to those skilled in the art) are elsewhere described in this application as "margin-dependent" or "margin-related" parameters. A specific configuration of a given DSL line (which can include one or more of the above-listed control parameters) is often collectively called a DSL line "profile," which term has been used accordingly herein and which is well understood by those skilled in the art.

Embodiments of the present invention adaptively change the profiles of one or more DSL lines to reduce crosstalk noise and to improve DSL performance. A DSL line using a specified profile also can be said to be in a "state," as is well known to those skilled in the art. Embodiments of the present invention control the transition of one or more DSL lines between profiles or states. The transitions are performed by evaluating the current state of the line relative to one or more target states. The possible target states (also referred to herein as proposed or target profiles, or "second" profiles) for a given current state (that is, a "first" profile) of a DSL line are defined through transition matrices. Such transition matrices may include prioritization of the target states for a given current state. Evaluation of the feasibility of staying in the current state or moving to one of the target states can be based on distributions of reported and estimated data distilled from operational data collected from the DSL system. Detailed descriptions of methods and systems for controlling profile transitions in DSL systems are given in U.S. Ser. No. 11/071, 762, entitled DSL STATE AND LINE PROFILE CONTROL, filed Mar. 3, 2005, owned by ASSIA, Inc., which is incorporated by reference in its entirety for all purposes. The description herein discloses one or more examples of how profiles, transition matrices and transition rules can be designed to allow DSL lines to achieve reduced crosstalk and improved performance.

Figure 6:
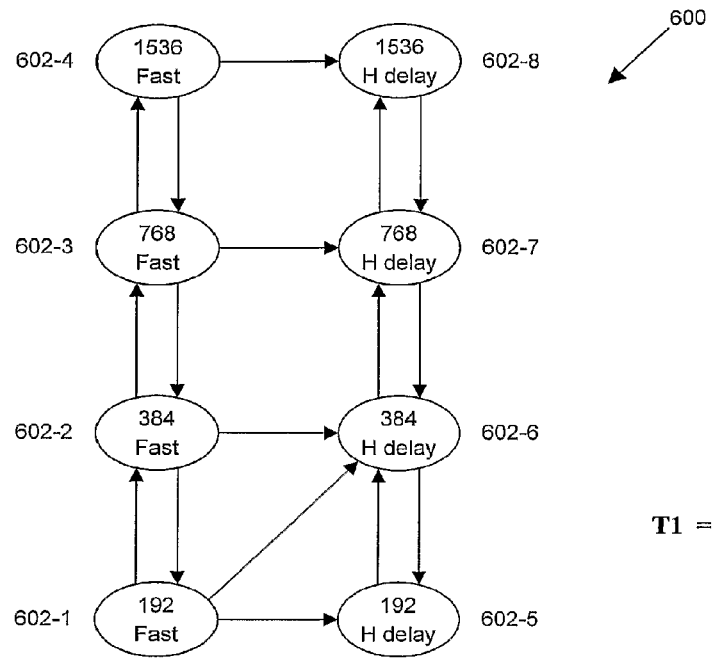
FIG. 6 shows the design and/or selection of one or more transition matrices and allowable profiles for use in connection with embodiments of the present invention.

Embodiments of the present invention can utilize, for example, a state diagram 600 as illustrated in FIG. 6, where 8 profiles 602-1, 602-2, 602-3, 602-4, 602-5, 602-6, 602-7 and 602-8 are profiles in which a DSL line may operate. In this example each profile is defined by a maximum attainable data rate (192, 384, 768 or 1536 kbps) and a latency ("Fast" meaning no interleaving; "H delay" meaning interleaving producing a high delay).

In FIG. 6, if a line is operating using profile 1, then from both the state diagram and the state-transition matrix T1 (where a 0 means that state is not available), it can be seen that profiles 1, 2, 5 and 6 are possible transitions (remaining in profile 1 is not a transition in sense of a change, but for ease of reference, remaining in the same profile may nevertheless be referred to as a "transition" herein). However, the state-transition matrix T1 does not indicate which transition, if any, should have priority above other transitions. Therefore, the change to matrix T2 of FIG. 6 can be made, where priority is specified by an integer value. The higher the positive integer value, the less attractive the designated profile is for service provider implementation.

In transition matrix T2, 0 still means that the transition is not allowed, and any positive integer means that the transition is allowed. The lowest positive integer has the highest priority above any other transition. For instance, a line in profile 1 will try to move to profile 2 if possible (that is, the priority is 1 from matrix T2). If profile 2 is not appropriate (for example, if the code violations are expected or measured to be too high in profile 2, "appropriateness" can be defined in some embodiments as feasibility as discussed in more detail below), then the line will attempt a move to profile 6 (that is, having a priority of 2 from matrix T2). If profile 6 is not appropriate, then profile 1 (having a priority of 3) will be examined and the profile would not be changed, if profile 1 is appropriate. If profile 1 also is not appropriate, then the line will move to profile 5, which has the lowest priority (that is, a priority of 4).

Transition matrix T2 of FIG. 6 can thus indicate both the possibility and the priority of transitions for each state/profile. The structure of T2 enables simple variation of many different profile characteristics such as data rate, power level, flat power-spectral-density (PSD) reference level, maximum margin, minimum margin, target margin, FEC delay, FEC strength and PSD shaping (sometimes known as PSD-MASK). For instance, depending on a set of specific permitted service types, some profiles can be blocked, while other profiles are given lower priorities. Alternatively, profiles with smaller carrier masks can be given higher priorities for the customers who pay accordingly (where economic factors are taken into consideration by the operator). Various lines can be thus programmed to yield part of the band whenever possible to enable better service on other lines (not taking into account regulatory implications of such polite binder sharing, which may be possible in some cases and not in others). As another example, profiles with higher target margins (for example, TARSNRM or TNMR) can be given higher priorities for a line that has frequent changes in noise level(s). The weighted state-transition matrix T2 thus allows dynamic change of the rules for profile selection as well as the dynamic selection of profile itself. The profile selection may also include a band-preference indication (or margin cap mode) that indicates preferred interpretation of the parameters for subsequent modem-loading operation.

In some embodiments of the present invention, an overall rule may simply be a function whose inputs are the results from a group of sub-rules and whose output is either "yes" or "no" to the transition from n to m. In one embodiment, an overall rule can be called only if a minimum new data requirement is satisfied. Such a rule, one example of which is illustrated in FIG. 7, can be composed of two parts, a "good behavior" qualification and a "bad behavior" qualification (that is, showing a sufficient absence of bad behavior), where a transition to state m is allowed only if both qualifications are satisfied. Using sub-rules as noted above, many of the outputs do not have to be used in the overall rule of FIG. 7. The sub-rules can represent a general structure when data rate, margin, code violation and retraining are of concern, and changes to the overall rule might utilize any sub-combination of the sub-rules, as will be appreciated by those skilled in the art. In the example of FIG. 7, the sub-rules are denoted as follows: RRDC is reported rate distribution, ERDC is estimated rate distribution, RCVDC is reported code violations distribution, ECVDC is estimated code violations distribution, RMDC is reported margin distribution, EMDC is estimated margin distribution, RNRDC is reported retrain distribution, ENRDC is estimated retrain distribution.

The first part (the good behavior qualification) says that at least some sub-rules must report "GOOD" for a transition to be allowed. The requirement may consist of the following three conditions:

Good behavior for rate in either current state ("reported") or target state ("estimated");

Good behavior for code violation in either current state or target state; and

Good behavior for number of retrains in either current state or target state. Good-margin behavior is not included since good-rate behavior has a similar implication.

The second part (the bad behavior qualification) says that bad behavior should not be expected in a target state. As will be appreciated by those skilled in the art, the definition of bad behavior can differ depending on whether the state is moving down or up. When moving down, the performance in current state n serves as the lower limit of expected performance in the target state. When moving up, the performance in the current state serves as the upper limit of expected performance in the target state. Therefore the rules are slightly different whenever sub-rules related to the current state are involved. When the transition is neither moving up nor down, then a conservative decision is made by assuming it is moving up.

In some embodiments of the present invention, the method 800 of FIG. 8 can be used. Method 800 commences with the construction 810 (and/or implementation or programming) of the T matrix (or any other state-transition control mechanism), threshold tables (or the like), any rules and/or sub-rules governing transitions, and any rules for purging, discounting or otherwise weighting old data. A "current profile" or state n is selected and operation begins using this profile at 820. Operational data is collected at 830 and any old data available is purged and/or discounted as appropriate (for example, by using a data weighting vector W). Method 800 then verifies that there is sufficient new data (for example, both reported data and estimated data) at 840 to permit evaluation of the infeasibility of any target state (using the rule that any state is presumed feasible until proven otherwise). If sufficient new data is not available, then the method returns to data collection at 830.

If sufficient new data has been assembled, then feasibility tests can be run at 850 for all potential target states m to determine whether any can be disqualified. The feasibility (infeasibility) tests performed at 850 may take into account collected operational data such as indications of modem capabilities or modem features. Once the eligible target states have been identified, the system may move at 860 to the highest priority state available. The system then can update transition rules and data at 870, such as a T matrix, threshold tables, data weighting rules/vectors, etc. and return to data collection at 830 for the next transition evaluation.

Various levels of information may be available for an individual line on which the design of profiles, transition matrices and transition rules can be based. Such designs may depend on the amount of "binder-level information" that is available to the individual line. The binder-level information can include (but is not necessarily limited to) and be categorized as:

Deployment information—In this case, binder-level information includes the characterization of a DSL line as being deployed from a CO, an RT, the SAI, and/or other points within the local loop topology. No information is available about distances between the CO, the RT, the SAI, or other points, or about the crosstalk coupling strength between lines.

Topology information—In addition to deployment information, topological information about the relative location of CO, RT, SAI or other deployment points may be available. Such information can comprise location information of such deployment points or approximate distances between such deployment points. Information about the neighborhood that the DSL line reaches may also be available. Neighborhood information may comprise an indication that lines in the neighborhood that the DSL line reaches are affected by certain kinds of noise sources (e.g. HDSL, SHDSL, radio-frequency interference). No information about crosstalk coupling strength between specified lines is available. Bridged-tap presence, location and length information may or may not be available.

Crosstalk coupling information—In addition to deployment and topology information, this case includes information about crosstalk interaction between DSL lines. Such crosstalk interaction information may comprise crosstalk coupling parameters, crosstalk strength characterization, crosstalk noise, etc.

Such binder-level information can be collected using collecting means 320 from an appropriate source (for example, a CO 146, source 348, etc. as shown, for example, in FIG. 3A). The DSM Technical Report defines the Xlin and Xlog parameters as containing crosstalk coupling information. Xlin denotes the insertion loss function representing the crosstalk coupling between a first disturbing DSL line and a second disturbed DSL line. Xlog denotes the logarithmic magnitude of Xlin. Also, databases are maintained by DSL service providers/network operators that may contain deployment information and/or topology information. Such databases are part of Operations Support Systems (OSS), and may be known as wire-map databases. In some embodiments of the present invention, the binder-level information can be estimated using the analyzer 300 of a controller 310 as shown in FIG. 3A. As one example, methods and systems described in U.S. Ser. No. 11/342,028, referenced above, can be used to extract information about a binder from collected DSL operational data, though other such methods and/or systems are known to those skilled in the art.

When only deployment information is available, then different profiles, transition matrices and transition rules may be used for each line depending on the deployment point of the line. For a deployment point such as an RT, which typically lies closer to the customer premises and for which higher frequencies can be used reliably for downstream DSL transmission, the profiles can include profiles that restrict the use of lower frequencies in the downstream direction. For example, profiles for which lower downstream frequencies are completely disabled, or profiles for which the downstream PSD mask at lower frequencies is lower than the downstream PSD mask at higher frequencies may be used. For a deployment point such as a CO, which typically lies farther from the customer premises and in which lower frequencies can be used more effectively for downstream DSL transmission, the profiles can include profiles that restrict the use of higher frequencies, and allow higher transmitted power levels in the lower frequencies. Such control of power usage can be achieved by configuring parameters such as PSDMASK, CARMASK, MAXSNRM, TARSNRM, BANDPREF, MAXNOMPSD, MAXNOMATP, MAXRXPWR, DPBOSHAPED (Downstream Power Back-Off Shaped), UPBOSHAPED (Upstream Power Back-Off Shaped), margin cap mode and the like (some of which are defined in current amendments to G.997.1), in either the downstream or the upstream direction.

In an example of one embodiment of a method for ADSL service operating from an RT, in the absence of more detailed information, the design of profiles for the RT (for example, at 525 of FIG. 5) can be based on a worst-case analysis with respect to the strength of crosstalk experienced by DSL receivers of CO-based DSL lines, and which is induced by DSL transmissions from the RT. Using either theoretical models or field data, a number of scenarios can be simulated with increasingly stronger crosstalk situations. For example, a mild crosstalk situation would be with a CO line of 12 kft and an RT line of 10 kft, where the RT is located 2 kft from the CO. A strong crosstalk situation would be with a CO line of 12 kft and an RT line of 4 kft, where the RT is located 8 kft from the CO. For each such scenario, a suitable spectrum management method (for example, OSB, ISB, SCALE, C-NRIA, band preference methods that are known to those skilled in the art) can be used to derive by simulation an RT profile with the desired data rate range and reduced crosstalk. The simulation may be repeated for various desired data rate points to obtain a number of possible (that is, allowed or allowable) profiles. Thus, a group of RT profiles can be designed corresponding to increasingly stronger crosstalk conditions. A similar procedure can be followed to design profiles for DSL services operating from other locations (for example, a CO).

Figure 9:
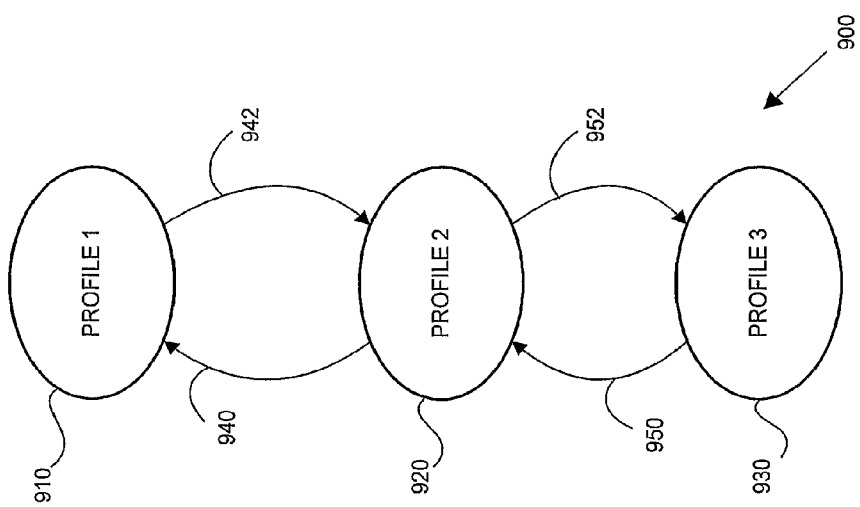
FIG. 9 is an exemplary state diagram for use in connection with embodiments of the present invention.

Thus, profiles can be designed for DSL services either at the CO or at the RT. The transition matrices for these profiles can be designed with a higher priority on desired characteristics (for example, profiles that minimize frequency usage, minimize transmitted power, minimize induced crosstalk, etc.). A set of narrow range rate-adaptive profiles may also be used, allowing the DSL manager (controller, DSL optimizer, SMC, DSM Center, etc.) to choose a lower target margin and a range of data-rate operation for the line that leads to lower retrain rates, lower customer-churn possibility, and/or lower maintenance actions/costs as well as increasing the average rate/range footprint for the service provider. Such operation is sometimes called "Tiered Rate Adaptation" or TRA. The transition rules (or thresholds) can be based on a variety of criteria, as noted in U.S. Ser. No. 11/071,762, referenced above. The transition rules can be designed so that, if the DSL line operates reliably in a current state/profile, and if the DSL line also is likely to operate reliably in a state/profile that might reduce crosstalk, then the DSL line state/profile should be changed to the state/profile that should reduce crosstalk. An example of such profiles, transition matrices and transition rules is shown in FIG. 9. Transition rules may be adapted to the line and the desired acceptable probability of customer dissatisfaction in the form of churn rates, trouble calls, truck rolls, etc.

The system/method of FIG. 9 has 3 profiles 910, 920, 930 available (that is, allowable profiles). In profile 910 all frequencies are allowed (usable); in profile 920 only frequencies above 400 kHz are allowed; and in profile 930 only frequencies above 800 kHz are allowed. Transitions are allowed as follows:

940, 942—between profile 910 and profile 920; and
950, 952—between profile 920 and profile 930.

Transitions can be restricted to being performed only when specified conditions are met. Examples of these types of conditions follow (where CV stands for code violations in DSL operation):

942—Profile 1 to Profile 2—CV=0 for 99% of time, rate at profile 1.gtoreq.target rate for 99% of time, estimated rate at profile 2.gtoreq.target rate

940—Profile 2 to Profile 1—CV>10 for 5% of time, rate at profile 2<target rate for 5% of time, estimated rate at profile 1.gtoreq.target rate

952—Profile 2 to Profile 3—CV=0 for 99% of time, rate at profile 2.gtoreq.target rate for 99% of time, estimated rate at profile 3.gtoreq.target rate

950—Profile 3 to Profile 2—CV>10 for 5% of time, rate at profile 3<target rate for 5% of time, estimated rate at profile 2.gtoreq.target rate When topology information also is available, the above-described techniques for identifying and using profiles, transition matrices and transition rules can be enhanced to take into account such information. The same principles identified above—placing more emphasis on the higher frequencies for downstream DSL transmission from the RT point and placing more emphasis on the lower frequencies for downstream DSL transmission from the CO point—can still be applied, but the additional distance and loop length information available in topology information can help to improve profiles by using real conditions rather than assumed worst-case conditions. Also, for upstream DSL transmission (for example, for VDSL1 and VDSL2), profiles with different upstream power back-off or power spectral density, possibly with band preference (or margin cap mode) on or off, configurations can be used depending on topological knowledge such as the length of neighboring loops.

When topology information is available as all or part of the binder-level information, DSL system configurations for ADSL service operating from the RT and having knowledge of the loop topology can be implemented using embodiments of the present invention. The selection and/or computation of profiles allowed for use with a given DSL system (for example, at 525 of FIG. 5) can still be based on an analysis regarding the strength of crosstalk experienced by the DSL receivers of CO-based DSL lines, and induced by DSL transmissions from the RT. But the loop topology knowledge allows the analysis to be performed for the known parameters of loop length and distance between CO and RT. Simulation is still performed for various scenarios that progressively assume stronger crosstalk coupling (for example, 50% worst-case crosstalk, 90% worst-case crosstalk, 99% worst-case crosstalk). For each such scenario, one of the previously mentioned spectrum management methods (OSB, ISB, SCALE, C-NRIA, band preference method) can be used to derive by simulation an RT profile with the desired data rate range and reduced crosstalk. The simulation may be repeated for various desired data rate points to obtain a number of allowable profiles. Thus, a group of RT-based profiles is designed corresponding to increasingly stronger crosstalk conditions. A group of CO profiles can be designed in the same manner. Consequently, transition matrices and transition rules can be introduced in a way similar to the case where only deployment information is available.

When topology information is available as all or part of the binder-level information, DSL system configurations for VDSL service with UPBO and again having knowledge of the loop topology can be implemented using embodiments of the present invention. Knowing the loop topology again allows simulation of a number of scenarios with progressively stronger crosstalk coupling in designing/selecting allowable profiles (for example, at 525 of FIG. 5). The result of simulation is a corresponding profile for each scenario for the application of upstream power back-off. Such back-off may be applied by controlling the reference PSD, PSDREF, the electrical length, UPBOKLE, the constants a and b of the known UPBO algorithm, or by controlling PSDMASK and CARMASK. This group of profiles can then be used in conjunction with transition matrices and transition rules to reduce upstream FEXT in VDSL. The transition matrices are designed with higher priority placed on profiles that achieve more aggressive power reductions. The transition rules are designed so that a transition to a profile with more aggressive power reduction is allowed only if the current DSL line state exhibits an adequate level of stability and if it is estimated that the transition will not cause the DSL line performance to fall below a minimum acceptable level.

When crosstalk-coupling information is also available, the design of profiles, transition matrices and transition rules can take into account such information. In such a case, the configuration parameters related to power controls can be obtained by executing a simulation under the known conditions. One of the previously mentioned spectrum balancing methods (OSB, ISB, SCALE, C-NRIA, band preference method) can be used to derive by simulation the RT or CO profile with the desired data rate range that achieves reduced crosstalk on neighboring pairs. The simulation can be performed for various desired data rate points to obtain multiple possible profiles, including the use of different loading algorithms by the various modems in the binder depending on whether band preference (also known as margin cap mode) is on or off. This methodology can be applied for determining the parameters of the downstream and/or the upstream transmission. Thus, a group of profiles is designed corresponding to different data rate points, but optimized for the specific loop and crosstalk conditions.

When crosstalk-coupling information is also available, the design of transition matrices and transition rules can be performed in a way similar to the case where only topology information is available. Transition rules can be further enhanced so that they include rules for collected parameters (collected operational data) from lines in the same neighborhood (that is, lines in close physical proximity) as the line under consideration for a transition. For example, a transition rule for increasing the data rate of a line may require that the data rate of a neighboring line exceeds a certain threshold for some percentage of the total observation time.

Figure 10:
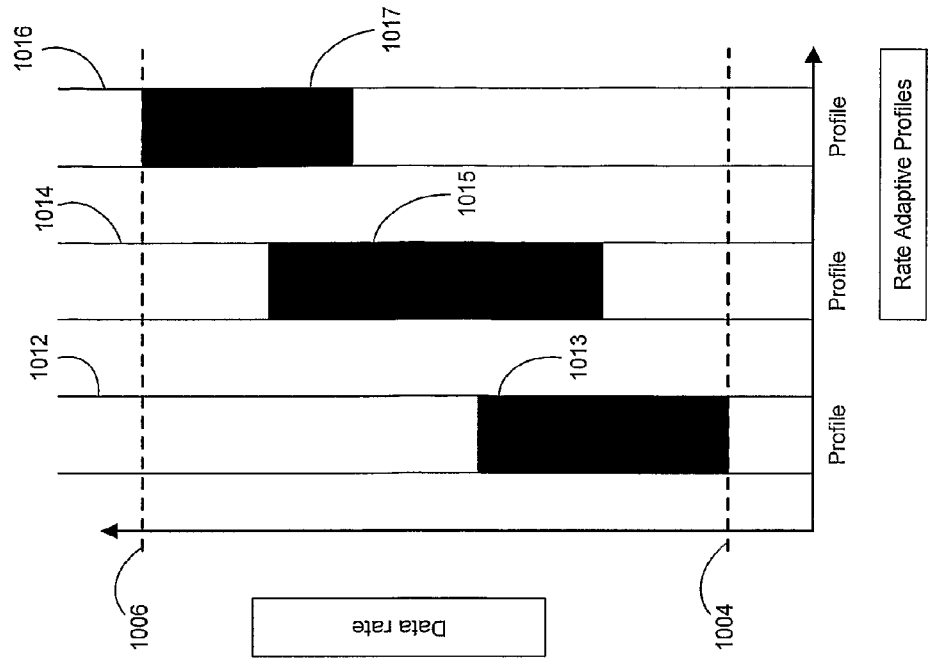
FIG. 10 is an exemplary set of DSL line profiles.

In another embodiment of the present invention, "tiered rate adaptive" (TRA) profiles can be designed for DSL services. A profile typically includes the configuration parameters of minimum net data rate and maximum net data rate. An example of a set of TRA profiles is shown in FIG. 10, where TRA profiles 1012, 1014, 1016 use gradually higher data rate windows 1013, 1015, 1017, respectively, to achieve higher profile minimum net data rate and profile maximum net data rate settings that are within the allowed and/or achievable minimum data rate 1004 and maximum data rate 1006. Thus, the combination of the set of TRA profiles covers the entire data rate range which would otherwise be covered by a single rate adaptive profile with a minimum net data rate 1004 and a maximum net data rate 1006. The minimum net data rate over all the TRA profiles is equal to the minimum net data rate of the otherwise used rate adaptive profile, and the maximum net data rate over all the TRA profiles is equal to the maximum net data rate of the otherwise used rate adaptive profile. The combined use of the TRA profiles allows a net data rate range that covers the data rate range between the minimum net data rate and the maximum net data rate of an otherwise used rate adaptive profile. The example of FIG. 10 shows 3 TRA profiles, however, other embodiments can use a different number of TRA profiles. TRA profiles typically use the same target SNR margin (TARSNRM), though are not required to do so. Such TRA profiles with a constrained range for minimum and maximum net data rate have significant advantages compared to a single rate-adaptive (RA) profile that has a wide net data rate variation. If a DSL line using an RA profile trains during a time with weak noise conditions, then it has a high risk of retrain at a later time if the noise becomes stronger. On the other hand, such retrains can be prevented if the appropriate TRA profile is used, so that the maximum net data rate of the TRA profile does not exceed the attainable maximum net data rate 1006 at any time. Using the process shown in FIG. 5, the appropriate TRA profile 1012, 1014, 1016 can be selected based on current and estimated rate distribution data.

If a single RA profile is used with a high target SNR margin, then a noise increase can trigger a retrain that can leave the line in a state with a very low rate. This also is prevented by the TRA profiles, because the maximum net data rate is constrained, while the target SNR margin can still be allowed to have a relatively small value. TRA profiles have advantages over RA profiles in that they can lead to lower retrain rates, lower customer-churn possibility, lower maintenance actions/costs, etc. They also can increase the average rate/range footprint for the service provider.

Generally, embodiments of the present invention employ various processes involving data stored in or transferred through one or more modems and/or computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, instruction signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers, processors, modems or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 11:
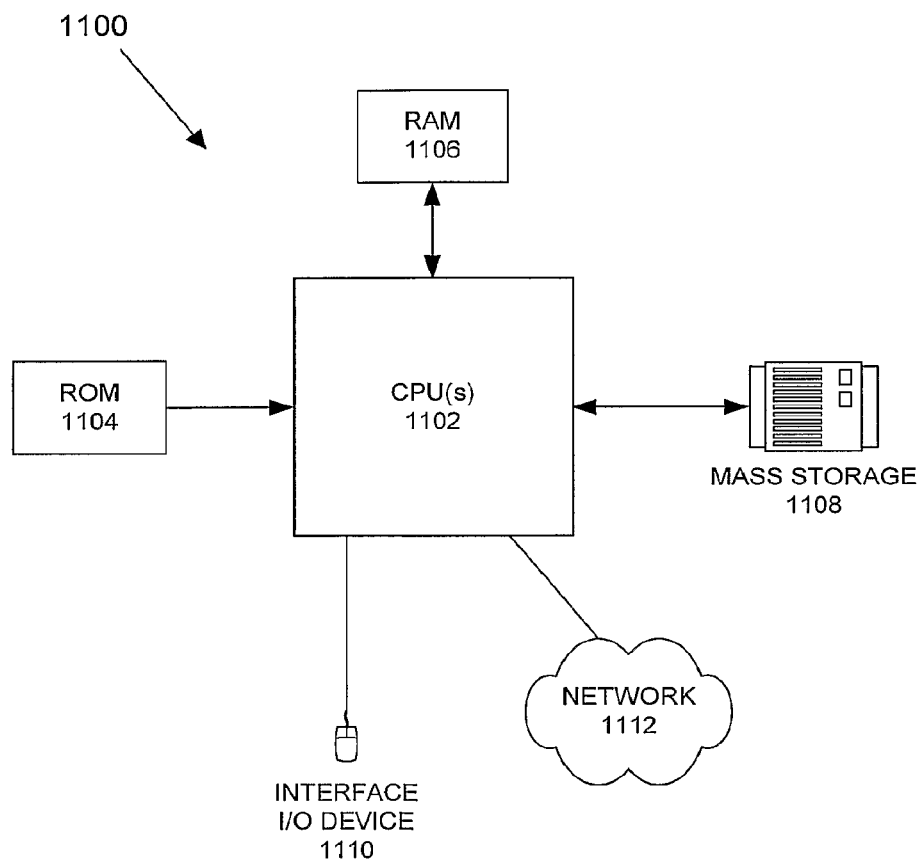
FIG. 11 is a block diagram of a typical computer system suitable for implementing embodiments of the present invention.

FIG. 11 illustrates a typical computer system that can be used by a user and/or controller in accordance with one or more embodiments of the present invention. The computer system 1100 includes any number of processors 1102 (also referred to as central processing units, or CPUs) that are coupled to storage devices including primary storage 1106 (typically a random access memory, or RAM), primary storage 1104 (typically a read only memory, or ROM). As is well known in the art, primary storage 1104 acts to transfer data and instructions uni-directionally to the CPU and primary storage 1106 is used typically to transfer data and instructions in a bi-directional manner. Both of these primary storage devices may include any suitable of the computer-readable media described above. A mass storage device 1108 also is coupled bi-directionally to CPU 1102 and provides additional data storage capacity and may include any of the computer-readable media described above. The mass storage device 1108 may be used to store programs, data and the like and is typically a secondary storage medium such as a hard disk that is slower than primary storage. It will be appreciated that the information retained within the mass storage device 1108, may, in appropriate cases, be incorporated in standard fashion as part of primary storage 1106 as virtual memory. A specific mass storage device such as a CD-ROM may also pass data uni-directionally to the CPU.

CPU 1102 also is coupled to an interface 1110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1102 optionally may be coupled to a computer or telecommunications network using a network connection as shown generally at 1112. Connection 1112 may be used to communicate with the DSL system and/or modems of interest. In some cases, the computer system 1100 may have a proprietary, dedicated and/or otherwise specific connection with the DSL system, perhaps through an operator's facilities (for example, a CO) or in some other suitable manner (for example, connecting to the NMS of a given DSL system). With such connections, it is contemplated that the CPU might receive information from the network and/or DSL system, or might output information to the network and/or DSL system in the course of performing the above-described method steps. The above-described devices and materials will be familiar to those of skill in the computer hardware and software arts. The hardware elements described above may define multiple software modules for performing the operations of this invention. For example, instructions for running a margin monitoring and control controller may be stored on mass storage device 1108 (which may be or include a CD-ROM) and executed on CPU 1102 in conjunction with primary memory 1106 and a suitable computer program product in use on system 1100. In a preferred embodiment, the controller is divided into software submodules.

The many features and advantages of the present invention are apparent from the written description, and the appended claims are intended to cover all such features and advantages of the invention. Further, since numerous modifications and changes will readily occur to those skilled in the art, the present invention is not limited to the exact construction and operation as illustrated and described. Therefore, the embodiments described should be taken as illustrative, not restrictive, and the invention should not be limited to the details given herein but should be defined by the following claims and their full scope of equivalents, whether foreseeable or unforeseeable now or in the future.

We claim:

1. A method for configuring a first Digital Subscriber Line (DSL) system, the method comprising:
    collecting operational data pertaining to the first DSL system from a customer premises equipment (CPE), wherein the first DSL system is configured to operate with a first profile;
    selecting a second profile which is one of a plurality of allowed profiles based on the collected operational data;
    determining whether the first DSL system is capable of operating with the second profile based on the collected operational data and one or more transition rules, wherein the second profile is an available profile for transition from the first profile; and
    instructing the first DSL system to operate with the second profile when the first DSL system is capable of operating with the second profile based on the collected operational data and the one or more transition rules.

2. The method of claim 1, wherein instructing the first DSL system is performed by the CPE.

3. The method of claim 1, wherein instructing the first DSL system is performed by a Digital Subscriber Line Access Multiplexer (DSLAM).

4. The method of claim 1 further comprising:
    selecting a third profile when the first DSL system is incapable of operating with the second profile based on the collected operational data and the one or more transition rules, wherein the third profile is an allowed profile based on a binder-level information;
    determining whether the first DSL system is capable of operating with the third profile based on the collected operational data and the one or more transition rules, wherein the third profile is an available profile for transition from the first profile; and
    instructing the first DSL system to operate with the third profile when the first DSL system is capable of operating with the third profile based on the collected operational data and the one or more transition rules.

5. The method of claim 1, wherein the operational data is collected from one of the following:
    a controller that controls the first DSL system;
    a controller that controls one or more neighboring DSL systems;
    a controller that controls a DSL system other than the first DSL system; and
    a private operational data source; and
    a public operational data source.

6. The method of claim 1, wherein the first profile comprises a first profile minimum data rate and a first profile maximum data rate;
    wherein the second profile comprises a second profile minimum data rate and a second profile maximum data rate; and
    wherein the first profile and the second profile meet one of the following conditions:
        a first condition in which the first profile minimum data rate is smaller than or equal to the second profile minimum data rate and the first profile maximum data rate is smaller than the second profile maximum data rate; and
        a second condition in which the second profile minimum data rate is smaller than or equal to the first profile minimum data rate and the second profile maximum data rate is smaller than the first profile maximum data rate.

7. The method of claim 1, wherein the collected operational data comprises a parameter value set comprising one or more parameter values, and
    wherein the transition rules comprise comparing an operational value to a threshold value, wherein the operational value is one of the following:
        a single parameter value in the parameter value set;
        a calculated value based on one or more parameter values in the parameter value set; and
        a combination of parameter values in the parameter value set.

8. The method of claim 4, wherein the binder-level information comprises binder-level deployment information comprising:
    first deployment information about the first DSL system; and
    neighboring deployment information about one or more neighboring DSL systems that are physically close to the first DSL system.

9. The method of claim 1, wherein the allowed profiles include profiles with one of the following characteristics:
    one or more lower frequencies disabled;
    one or more lower frequencies having lower PSD mask than higher frequencies;
    upstream power back-off enabled;
    one or more upstream power back-off parameters with values different than default values;
    band preference enabled; and
    margin cap mode enabled.

10. The method of claim 1, wherein the allowed profiles comprise configuration parameter values computed through the use of a spectrum balancing method,
    wherein the spectrum balancing method applies a binder-level deployment information;
    wherein the spectrum balancing method applies one of the following:
        an assumed worst-case loop topology, and
        actual topology information; and
    wherein the spectrum balancing method applies one of the following:
        assumed crosstalk coupling information; and
        actual crosstalk coupling information.

11. The method of claim 4, wherein the binder-level information comprises binder-level topology information comprising:
    first topology information about the first DSL system; and
    neighboring topology information about one or more neighboring DSL systems that are physically close to the first DSL system.

12. The method of claim 1, wherein the allowed profiles comprise configuration parameter values computed through the use of a spectrum balancing method;
    wherein the spectrum balancing method applies one of the following:
        assumed deployment information; and
        actual deployment information;
    wherein the spectrum balancing method uses the binder topology information; and wherein the spectrum balancing method applies one of the following:
    assumed crosstalk coupling information; and
    actual crosstalk coupling information.

13. The method of claim 4, wherein the binder-level information comprises crosstalk coupling information between the first DSL system and a neighboring DSL system that is physically close to the first DSL system.

14. The method of claim 1, further comprising collecting operational data pertaining to a neighboring DSL system;
    wherein the collected operational data pertaining to the first DSL system comprises a first DSL system parameter value set comprising one or more parameter values;
    wherein the collected operational data pertaining to the neighboring DSL system comprises a neighboring DSL system parameter value set comprising one or more parameter values; and
    wherein the transition rules comprise comparing an operational value to a threshold value, wherein the operational value is one of the following:
        a single parameter value in the first DSL system parameter value set;
        a single parameter value in the neighboring DSL system parameter value set;
        a calculated value based on one or more parameter values in the first DSL system parameter value set;
        a calculated value based on one or more parameter values in the neighboring DSL system parameter value set;
        a combination of parameter values in the first DSL system parameter value set; and
        a combination of parameter values in the neighboring DSL system parameter value set.

15. The method of claim 1, wherein the allowed profiles comprise configuration parameter values computed through the application of a spectrum balancing method,
    wherein the spectrum balancing method applies one of the following:
        assumed deployment information; and
        actual deployment information;
    wherein the spectrum balancing method applies one of the following:
        actual topology information; and
        assumed topology information; and
    wherein the spectrum balancing method applies the crosstalk coupling information.

16. A computer program product comprising:
    a machine readable storage medium and program instructions encoded in the machine readable storage medium, the program instructions specifying a method for configuring a first Digital Subscriber Line (DSL) system, the program instructions when executed by a computer cause the computer to perform the method comprising:
        collecting operational data pertaining to the first DSL system from a customer premises equipment (CPE), wherein the first DSL system is configured to operate with a first profile;
        selecting a second profile which is one of a plurality of allowed profiles based on the collected operational data;
        determining whether the first DSL system is capable of operating with the second profile based on the collected operational data and one or more transition rules, wherein the second profile is an available profile for transition from the first profile; and
        instructing the first DSL system to operate with the second profile when the first DSL system is capable of operating with the second profile based on the collected operational data and the one or more transition rules.

17. The computer program product of claim 16, wherein instructing the first DSL system is performed by the CPE.

18. The computer program product of claim 16, wherein instructing the first DSL system is performed by a Digital Subscriber Line Access Multiplexer (DSLAM).

19. The computer program product of claim 16, wherein the method further comprises:
    selecting a third profile when the first DSL system is not capable of operating with the second profile based on the collected operational data and the one or more transition rules, wherein the third profile is an allowed profile based on a binder-level information;
    determining whether the first DSL system is capable of operating with the third profile based on the collected operational data and the one or more transition rules, wherein the third profile is an available profile for transition from the first profile; and
    instructing the first DSL system to operate with the third profile when the first DSL system is capable of operating with the third profile based on the collected operational data and the one or more transition rules.

20. The computer program product of claim 16, wherein the first profile comprises a first profile minimum data rate and a first profile maximum data rate;
    wherein the second profile comprises a second profile minimum data rate and a second profile maximum data rate; and
    wherein the first profile and the second profile meet one of the following conditions:
        a first condition in which the first profile minimum data rate is smaller than or equal to the second profile minimum data rate and the first profile maximum data rate is smaller than the second profile maximum data rate; and
        a second condition in which the second profile minimum data rate is smaller than or equal to the first profile minimum data rate and the second profile maximum data rate is smaller than the first profile maximum data rate.

21. The computer program product of claim 16, wherein the collected operational data comprises a parameter value set comprising one or more parameter values, and
    wherein the transition rules comprise comparing an operational value to a threshold value, wherein the operational value is one of the following:
        a single parameter value in the parameter value set;
        a calculated value based on one or more parameter values in the parameter value set; and
        a combination of parameter values in the parameter value set.

22. A hardware controller comprising:
    a data collection unit to collect operational data pertaining to a first Digital Subscriber Line (DSL) system from a customer premises equipment (CPE), wherein the first DSL system is configured to operate with a first profile;
    a data analysis unit to:
        select a second profile which is one of a plurality of allowed profiles based on the collected operational data; and
        determine whether the first DSL system is capable of operating with the second profile based on the collected operational data and one or more transition rules, wherein the second profile is an available profile for transition from the first profile; and a control signal generator to instruct the first DSL system to operate with the second profile when the first DSL system is capable of operating with the second profile based on the collected operational data and the one or more transition rules.

23. The hardware controller of claim 22, wherein the control signal generator to instruct the first DSL system via the CPE.

24. The hardware controller of claim 22, wherein the control signal generator to instruct the first DSL system via a DSLAM.

25. The hardware controller of claim 22, wherein the data analysis unit to:
select a third profile when the first DSL system is not capable of operating with the second profile based on the collected operational data and the one or more transition rules, wherein the third profile is an allowed profile based on a binder-level information; and
determine whether the first DSL system is capable of operating with the third profile based on the collected operational data and the one or more transition rules, wherein the third profile is an available profile for transition from the first profile.

26. The hardware controller of claim 22, wherein the control signal generator to instruct the first DSL system to operate with the third profile when the first DSL system is capable of operating with the third profile based on the collected operational data and the one or more transition rules.

27. The hardware controller of claim 22, wherein the operational data comprises data pertaining to one of the following:
band preference indication;
margin cap mode indication;
indication that margin per tone should be kept smaller than the maximum SNR margin;
service priorities pertaining to net data rate;
service priorities pertaining to excess margin;
service priorities pertaining to excess margin per tone;
service priorities pertaining to delay;
service priorities pertaining to impulse noise protection;
indication of loading algorithms used with the first DSL system;
indication of power allocation algorithms used with the first DSL system;
maximum attainable data rate;
current data rate;
margin;
channel attenuation per tone;
average attenuation;
quiet line noise per tone;
active line noise per tone;
SNR per tone;
transmitted PSD per tone;
DPBOSHAPED;
UPBOSHAPED;
echo response;
band preference;
margin cap mode;
FEC correction count;
code violation count;
errored seconds;
severely errored seconds;
number of retraining count;
current delay;
error distributions;
current impulse noise protection; and
FEC and interleaving parameters.

28. The hardware controller of claim 22, wherein the operational data is collected from one of the following:
a controller that controls the first DSL system;
a controller that controls one or more neighboring DSL systems;
a controller that controls a DSL system other than the first DSL system; or
a private operational data source; and
a public operational data source.

29. The hardware controller of claim 22, wherein the first profile and the second profile each comprise one of the following configuration parameters:
maximum nominal power spectral density;
MAXNOMPSD;
maximum nominal aggregate transmit power;
MAXNOMATP;
power cutback;
PCB;
DPBOSHAPED;
downstream power back-off shaped parameters;
UPBOSHAPED;
upstream power back-off shaped parameters;
fine gains;
gi;
transmit spectral scaling factors;
tssi;
power spectral density mask;
PSDMASK;
power spectral density level;
maximum received power;
MAXRXPWR;
upstream power "back-off" parameters;
UPBOKLE;
margin cap mode;
carrier mask;
CARMASK;
minimum impulse noise protection;
MININP;
maximum delay;
MAXDELAY;
target margin;
TARSNRM;
minimum margin;
MINSNRM;
maximum margin;
MAXSNRM;
band preference indication;
PREFBAND;
target data rate;
minimum data rate;
maximum data rate;
FEC and interleaving parameters;
per tone bit cap;
BCAP[n];
per tone target margin;
TARSNRM[n];
reference noise; and
REFNOISE.

30. The hardware controller of claim 22, wherein the first profile comprises a first profile minimum data rate and a first profile maximum data rate;
wherein the second profile comprises a second profile minimum data rate and a second profile maximum data rate; and
wherein the first profile and the second profile meet one of the following conditions:

a first condition in which the first profile minimum data rate is smaller than or equal to the second profile minimum data rate and the first profile maximum data rate is smaller than the second profile maximum data rate; and a second condition in which the second profile minimum data rate is smaller than or equal to the first profile minimum data rate and the second profile maximum data rate is smaller than the first profile maximum data rate.

31. The hardware controller of claim 22, wherein the collected operational data comprises a parameter value set comprising one or more parameter values, and wherein the transition rules comprise comparing an operational value to a threshold value, wherein the operational value is one of the following:
   a single parameter value in the parameter value set;
   a calculated value based on one or more parameter values in the parameter value set; and
   a combination of parameter values in the parameter value set.

32. The hardware controller of claim 25, wherein the binder-level information comprises binder-level deployment information comprising:
   first deployment information about the first DSL system; and
   neighboring deployment information about one or more neighboring DSL systems that are physically close to the first DSL system.

33. The hardware controller of claim 32, wherein the binder-level deployment information comprises one of the following:
   an indication of whether the first DSL system is deployed from a central office, a remote terminal, a service access interface, an optical network unit, or a remote DSLAM; and
   an indication of whether a neighboring DSL system is deployed from a central office, a remote terminal, a service access interface, an optical network unit, or a remote Digital Subscriber Line Access Multiplexer (DSLAM).

34. The hardware controller of claim 22, wherein the allowed profiles include profiles with one of the following characteristics:
   one or more lower frequencies disabled;
   one or more lower frequencies having lower PSD mask than higher frequencies;
   upstream power back-off enabled;
   one or more upstream power back-off parameters with values different than default values;
   band preference enabled; and
   margin cap mode enabled.

35. The hardware controller of claim 22, wherein the allowed profiles comprise configuration parameter values computed through the use of a spectrum balancing method,
   wherein the spectrum balancing method applies a binder-level deployment information;
   wherein the spectrum balancing method applies one of the following:
      an assumed worst-case loop topology, and
      actual topology information; and
   wherein the spectrum balancing method applies one of the following:
      assumed crosstalk coupling information; and
      actual crosstalk coupling information.

36. The hardware controller of claim 25, wherein the binder-level information comprises binder-level topology information comprising:
   first topology information about the first DSL system; and
   neighboring topology information about one or more neighboring DSL systems that are physically close to the first DSL system.

37. The hardware controller of claim 36, wherein the binder-level topology information comprises one of the following:
   location information regarding a deployment point;
   location information regarding customer premises equipment;
   loop length;
   neighborhood information;
   distance of a deployment point from a reference point; and
   distance of customer premises equipment from a reference point.

38. The hardware controller of claim 22, wherein the allowed profiles comprise configuration parameter values computed through the use of a spectrum balancing method;
   wherein the spectrum balancing method applies one of the following:
      assumed deployment information; and
      actual deployment information;
   wherein the spectrum balancing method uses the binder topology information; and
   wherein the spectrum balancing method applies one of the following:
      assumed crosstalk coupling information; and
      actual crosstalk coupling information.

39. The hardware controller of claim 25, wherein the binder-level information comprises crosstalk coupling information between the first DSL system and a neighboring DSL system that is physically close to the first DSL system.

* * * * *